US007011171B1

(12) United States Patent
Poulter

(10) Patent No.: US 7,011,171 B1
(45) Date of Patent: Mar. 14, 2006

(54) RUGGED TERRAIN ROBOT

(76) Inventor: Andrew R. Poulter, 7467 W. Nichols Pl., Littleton, CO (US) 80128

( * ) Notice: Subject to any disclaimer, the term of this patent is extended or adjusted under 35 U.S.C. 154(b) by 216 days.

(21) Appl. No.: 10/680,446

(22) Filed: Oct. 7, 2003

Related U.S. Application Data

(60) Provisional application No. 60/416,973, filed on Oct. 8, 2002.

(51) Int. Cl.
B62D 51/00 (2006.01)
(52) U.S. Cl. ................. 180/8.2; 180/65.1; 280/5.32
(58) Field of Classification Search ........... 180/8.1, 180/8.2, 8.3, 8.4, 8.5, 8.6, 65.1, 908; 280/5.2, 280/5.26, 5.32, DIG. 10, 763.1, 764.4; 901/1
See application file for complete search history.

(56) References Cited

U.S. PATENT DOCUMENTS

| 3,283,839 | A | * | 11/1966 | Brown et al. ................. 180/8.2 |
| 3,550,709 | A | | 12/1970 | Hottel |
| 4,421,189 | A | | 12/1983 | Watkins et al. |
| 4,483,407 | A | | 11/1984 | Iwamoto et al. |
| 4,709,265 | A | | 11/1987 | Silverman et al. |
| 4,709,773 | A | | 12/1987 | Clement et al. |
| 4,815,011 | A | | 3/1989 | Mizuno et al. |
| 4,915,184 | A | | 4/1990 | Watkins |
| 4,932,831 | A | | 6/1990 | White et al. |
| 4,977,971 | A | | 12/1990 | Crane, III et al. |
| 4,993,912 | A | | 2/1991 | King et al. |
| 5,021,878 | A | | 6/1991 | Lang |
| 5,022,812 | A | | 6/1991 | Coughlan et al. |
| 5,186,270 | A | * | 2/1993 | West ......................... 180/6.62 |
| 5,193,632 | A | | 3/1993 | Clar et al. |
| 5,350,033 | A | | 9/1994 | Kraft |
| 5,378,969 | A | | 1/1995 | Haikawa |

(Continued)

FOREIGN PATENT DOCUMENTS

JP 59-50872 3/1984

OTHER PUBLICATIONS http://www.irobot.com/hom/default.asp, (iRobot Corporation), PackBot/Romba Robotic FloorVac, 1 page from internet.

(Continued)

Primary Examiner—Christopher Ellis
Assistant Examiner—Brian Swenson
(74) Attorney, Agent, or Firm—Rick Martin; Patent Law Offices of Rick Martin, P.C.

(57) ABSTRACT

A rugged terrain robot (RTR) apparatus can function as a reconnaissance robot to optimize safety of search or rescue personnel. Remote control places the RTR in either a rolling mode or in a stair-climbing mode. Remote feedback is provided by an on-board RTR camera and microphone. The RTR consists of two clamshell sections and a tail boom section. The RTR uses polymorphic locomotion of the clamshells for efficient maneuverability in traversing rugged terrain when in a "rolling" mode and is switched remotely into a stair-climbing mode (or extreme terrain) using end-over-end clamshell motion with a tail boom assist to climb stairways. The RTR can carry various communication devices, sensors and payloads for use by police, firemen, soldiers, rescue or other applications to optimize safety when direct entry by a human may not desirable until an area is reconnoitered. The RTR is remote controllable and easily transported to a reconnaissance area.

29 Claims, 22 Drawing Sheets

U.S. PATENT DOCUMENTS

| | | |
|---|---|---|
| 5,461,292 A | 10/1995 | Zondlo |
| 5,465,525 A | 11/1995 | Mifune et al. |
| 5,515,934 A | 5/1996 | Davis |
| 5,672,044 A | 9/1997 | Lemelson |
| 5,737,217 A | 4/1998 | Nishikawa et al. |
| 6,021,363 A | 2/2000 | Nishikawa et al. |
| 6,046,565 A | 4/2000 | Thorne |
| 6,062,600 A * | 5/2000 | Kamen et al. ............. 280/755 |
| 6,113,343 A | 9/2000 | Goldenberg et al. |
| 6,144,180 A | 11/2000 | Chen et al. |
| 6,164,398 A | 12/2000 | Alber |
| 6,256,556 B1 | 7/2001 | Zenke |
| 6,267,196 B1 | 7/2001 | Wilcox et al. |
| 6,336,642 B1 | 1/2002 | Carstens |
| 6,341,784 B1 * | 1/2002 | Carstens ................... 280/5.2 |
| 6,397,960 B1 | 6/2002 | Alber |
| 6,507,773 B1 | 1/2003 | Parker et al. |
| 6,584,376 B1 | 6/2003 | Van Kommer |
| 6,662,889 B1 * | 12/2003 | De Fazio et al. ............ 180/22 |
| 2003/0060679 A1 | 3/2003 | Murata et al. |

OTHER PUBLICATIONS http://www.irobot.com/rd/p15_STRIDE.asp, (iRobot Corporation), Stride, System Tasking and Recon Information Display Equipment, 1 page from internet.

Science Fiction News web page printout from www.technovelgy.com regarding "Throwbot-Pocket-Sized Recon Robot", printed Oct. 14, 2005, attached hereto.

SPIE International Symposium on Law Enforcement Technologies, Boston, MA, Abstract and Article download from www.hosc.mil/robots/pubs/SPIE4232A-69.pdf, entitled "Robotics for Law Enforcement: Applications beyond explosive ordinance [sic] disposal", by Hoa G. Nguyen and John P. Bott, Space and Naval Warfare Systems Center, Sand Diego, CA 92152 USA, attached hereto.

* cited by examiner

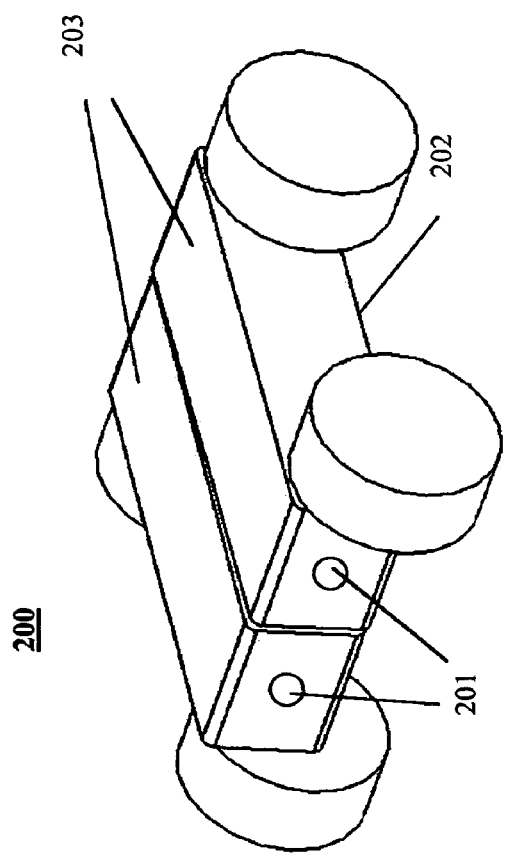
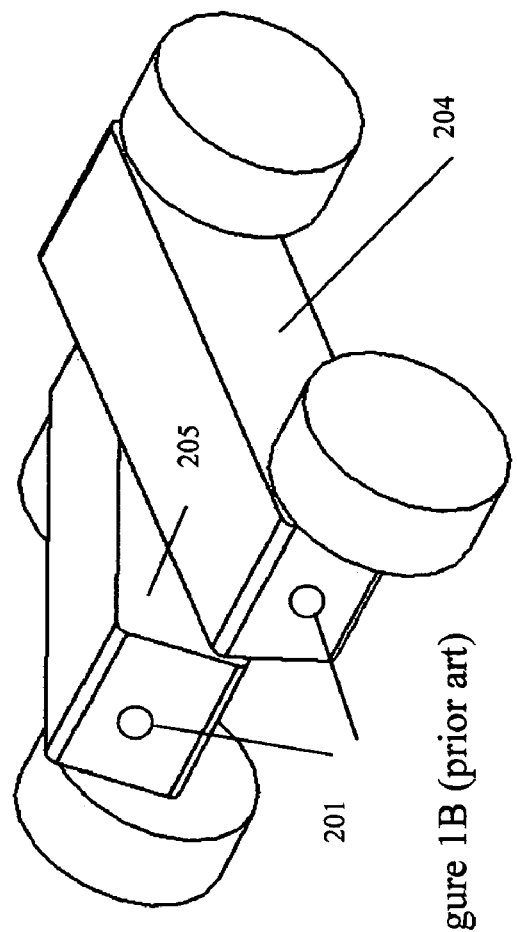
Figure 1A (prior art)
Figure 1B (prior art)

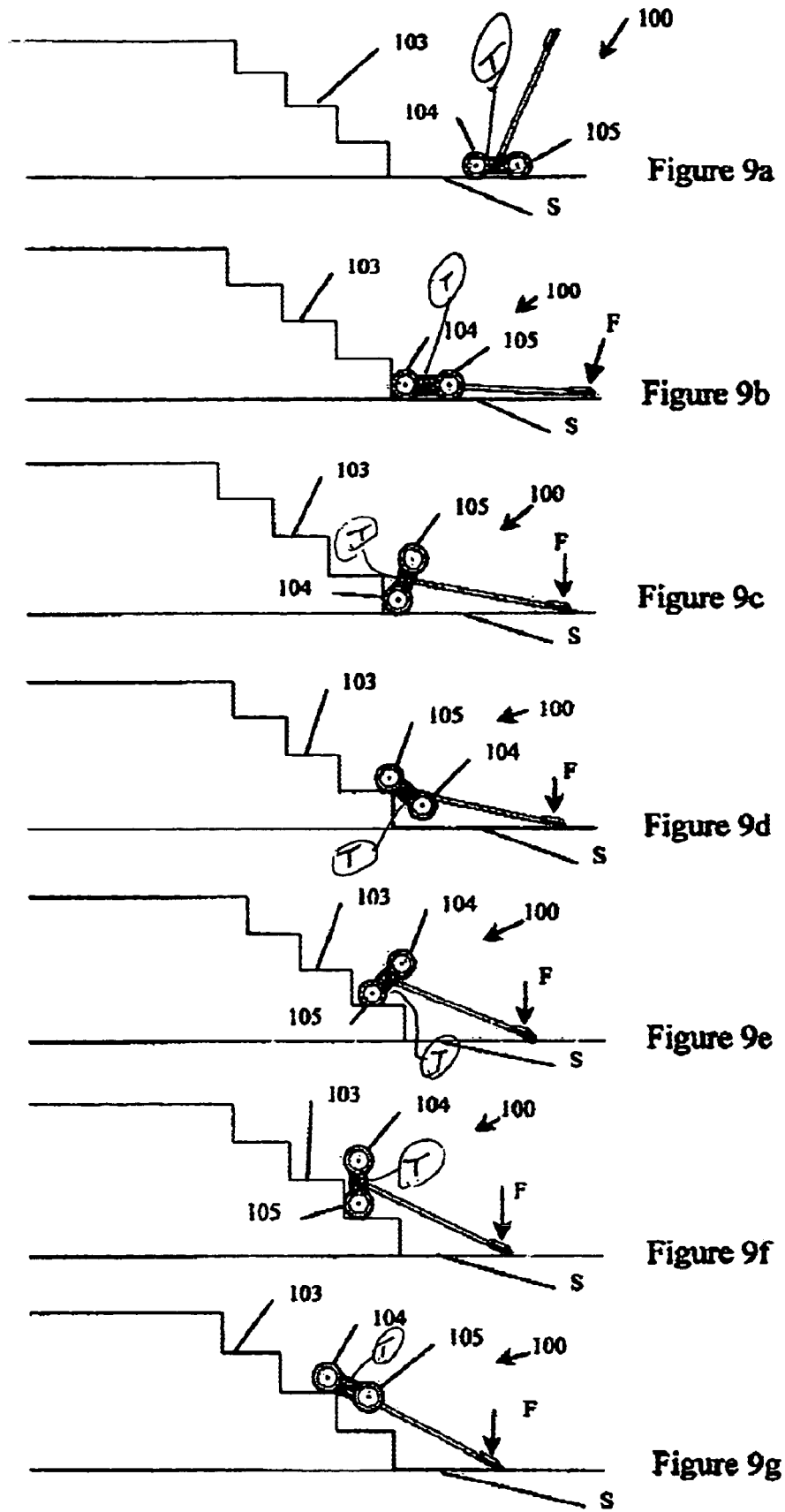

Section A

RUGGED TERRAIN ROBOT

CROSS REFERENCE APPLICATION

This application is a non-provisional application claiming the benefits of provisional application No. 60/416,973 filed Oct. 8, 2002.

FIELD OF THE INVENTION

The present invention relates to a reconnaissance robot. More specifically, it relates to a robotic rugged terrain apparatus, which operates in a rolling mode to traverse rugged terrain or in a stair-climbing mode to climb stairways and extreme terrain. The apparatus can carry various communication devices, sensors and payloads for use by police, firemen, soldiers, rescue or other applications where a direct entry by a human may not desirable until an area is reconnoitered.

BACKGROUND OF THE INVENTION

A potentially hostile site situation can be complex as deadly threats may lurk in unseen areas. The complexity and density of urban environments adds to the probability of posing deadly threats in areas that cannot be easily reconnoitered. In particular field circumstances where police, firemen, swat teams, soldiers, rescue personnel, or other search and/or rescue operations are employed, it is important to have a forward reconnaissance apparatus ahead of the search or rescue team. In some circumstances, danger may be around the next corner via an armed criminal (or enemy). In other circumstances the environment may contain a toxin or other harmful substance. Still in other circumstances danger may be present via obstacles, traps, etc. It is often necessary to climb up stairs, over rugged terrain or through an unfriendly environment in order to get to an area to be reconnoitered. Awareness of precise situations is a necessary requirement to optimize safety in field operations.

Present day field reconnaissance apparatus are designed for basically traveling on a relatively flat surface and, although they can deliver information back to a surveillance team, they are limited by their ability to get into difficult areas, especially when stair climbing is required.

What is needed is a simple device that is able to travel over rugged terrain, climb stairs and carry necessary visual, audio, sensor equipment as well as payloads. What is needed is a device that is able to arrive at a target area, reconnoiter an area, and send vital information back to a reconnaissance team prior to the team entering an area.

The present invention solves the aforementioned needs as will be shown with the following description and drawings.

SUMMARY OF THE INVENTION

The main aspect of the present invention is to provide a reconnaissance apparatus with stair-climbing capability.

Another aspect of the present invention is to provide a reconnaissance apparatus that can traverse over steep and rugged terrain.

Another aspect of the present invention is to provide an apparatus, which is designed with transposable bottom and back surfaces to maintain its function when either section is "flipped-over" to a position making it redundant to a "normal" position.

Another aspect of the present invention is to provide a reconnaissance apparatus that can be manufactured at low cost.

Yet another aspect of the present invention is to provide a reconnaissance apparatus that is small in size yet strong and ruggedly built.

Another aspect of the present invention is to provide a reconnaissance apparatus that is environmentally packaged.

Another aspect of the present invention is to provide a reconnaissance apparatus that is able to carry audio, visual, and/or a payload or other sensors.

Another aspect of the present invention is to provide a reconnaissance apparatus that can be packaged and easily man transported to an area of interest.

Other aspects of this invention will appear from the following description and appended claims, reference being made to the accompanying drawings forming a part of this specification wherein like reference characters designate corresponding parts in the several views.

The present invention provides a rugged terrain robot (RTR) that can be employed for reconnaissance in urban or other environments allowing police, firemen, soldiers, swat teams or other search and rescue personnel to easily reconnoiter an area. The RTR provided by the present invention is small in size and can operate as a stand-alone robot or as a mission robot that can be deployed from a larger robot. The RTR consists of two clamshell sections and a tail boom. Clamshell sections of the RTR use a polymorphic locomotion for efficient maneuverability over rubble in traversing rugged terrain when in a "rolling" mode. Clamshell sections are locked together, and the RTR uses a tail boom assist when in a "stair-climbing" mode.

The RTR is designed to carry an infrared camera and microphone, which are mounted on the tail boom section, for audio and visual feedback. The RTR also has room for other type sensors (gas detectors, biological weapons, toxic materials, etc.), weapons (lethal or non-lethal), audio equipment, manipulators, tools, and/or payload, which can be selectively tailored on an "as needed" basis to fulfill mission requirements. A precise picture and awareness of an operational environment can be obtained with the use of the RTR mobile apparatus. Further enhancement of an operational environment can be obtained with the use of a plurality of RTRs. The RTR Will provide a useful alternative to optimize the safety of personnel in high-risk situations.

The RTR is small, easily carried to a site via a car, trunk, backpack, etc. and is easily manufactured with a low cost.

Other features and advantages of the invention will become apparent from a consideration of the ensuing detailed description and drawings.

The RTR of the present invention is a reconnaissance apparatus with stair-climbing and rugged terrain capability. The RTR is designed to traverse over steep and rugged terrain and climb a stairway. The RTR is designed to be remotely directed for speed, steering, climbing, and optional communications in a non-tethered fashion. The RTR is also equipped with a camera, audio/video transmitters and can also be equipped with other sensors, speaker, payload, or other equipment as required. The RTR is small in size and is, thus, easily transportable to an area to be reconnoitered. It can be transported to an area via a car trunk, a backpack, or simply hand carried. The RTR can operate as a stand-alone unit or as a mission module. A mission module is defined herein as one that can be deployed from a larger robot depending on mission requirements.

The RTR uses a type of polymorphic locomotion system, which gives it the ability to act as a wheeled robot to quickly traverse moderately rugged terrain, and has a stair-climbing mode for efficient maneuverability in climbing steps (stairs) or in specific rugged terrain situations that present a step like barrier. Thus, the RTR can traverse a wide range of environmental conditions such as steps, building obstacles, debris, level ground, compound slopes, sand, rocks, ice, and other surfaces.

Several features of the RTR include, but not limited to:
1. Ability to travel in a switchable "rolling" mode or in a "stair-climbing mode" via remote control;
2. Ability to climb stairs via a unique tail boom assist;
3. Self righting with the ability to change to the most efficient locomotion dependent on the terrain;
4. Designed to be able to travel independent without regard to a specific "top" or "bottom" surface to the ground;
5. Ability to move quickly as a wheel driven robot or a stair climber;
6. Ability to carry and transmit video/audio via a camera (infrared or other) and microphone;
7. Ability to carry sensors, payloads, audio (one or two-way), manipulators, tools as determined by the mission requirements;
8. Designed with a base section consisting of a left and right clamshell design each with forward/reverse features for steering, skid steering, manipulation out of trouble spots, or locking together for stair-climbing;
9. Designed with a controllable tail boom section for stair climbing assist and for carrying a pod to house a camera and other equipment;
10. Designed with a unique rotatable axle housing to maintain all four drive wheels on the ground when in rolling mode and move the tail boom to a desired position;
11. Ability to overcome common hang-up or nose-in failures;
12. Ability to perform reconnaissance in activities in order to optimize safety in situations that could normally be hazardous to humans;
13. Small in size for ease of transport, manipulation in small areas;
14. Low in cost, especially important if mission payloads were destructible;
15. Other features are not necessarily mentioned but can be implied via the design and capabilities of the RTR as described below in the description and drawings.

The RTR design has a base consisting of two clamshells, each with two segments, and a tail boom. Each clamshell has two wheels attached. Each individual clamshell consists of two clamshell half segments that are designed to be one common manufacturable housing part number. The clamshells are connected together by a tail drive unit, to which the tail boom attaches. The RTR functions in two modes: simple rolling mode or stair-climbing (or extreme terrain) mode.

Each clamshell housing consists of a top and bottom clam shaped half segment that easily fit together. Each clamshell has two outer drive wheels attached. The internal drive motors, one within each clamshell segment, directly drive one of each of the two attached wheels, whereas a polymer drive belt (could also be a chain driven belt, etc.) drives the second wheel. Each clamshell also contains rechargeable batteries such as Lithium Ion, Nickel Metal Hydride, Nickel Cadmium, etc. Other internal parts consist of wheel axles, bearings, drive belt, motor holding bracket(s), a multi-channel receiver, motor drive controls, tail boom servo control, etc. Each clamshell segment contains compartments for batteries, motor(s), payload, servo, receivers, etc. A tail drive motor is also located within one of the two clamshells. The tail drive motor operates the tail boom. The tail drive motor and assembly will be discussed below. Each clamshell is environmentally packaged and low in manufacturing cost. One internally located receiver will control all three motors and the locking servo, whereas a second internally located receiver may control the tail boom camera.

The two clamshell assemblies are connected together by a tail assembly. The tail assembly consists of a tail boom arm assembly, onto which mounts a camera and other equipment as required (sensors, audio, etc.). The tail boom assembly consists of a top and bottom section. Although a single boom design can be employed, a two-section tail boom design allows ease of portability. The lower tail boom section mounts to a center axle hub block. The center axle hub block functions to mount an interconnect central axle shaft, the tail boom arm, axle bearings, gears, a suspension arm for limiting tail boom rotation, a locking cam to lock both clamshells together, etc. The center axle hub block provides connectivity for the interconnect central axle, which is rigidly affixed to one of the clamshells and is allowed to rotate at the other clamshell. The interconnect central axle is hollow to facilitate wire inter-connectivity between the two clamshells. The interconnect central axle has a suspension arm rigidly attached. The suspension arm functions to both limit the tail boom travel when in rolling mode and provides a locking surface to a servo controllable locking cam to interlock both clamshells when in stair-climbing mode.

Each clamshell and respective primary drive units are free to rotate relative to each other via the suspension arm and interconnect central axle when the RTR is in the rolling mode. Although other rotational limits are possible, the suspension arm limits each clamshell rotation to about 45-degrees, which has been found to be beneficial in climbing over rugged terrain. The tail boom will normally be in an upright position when in the rolling mode. The tail boom can be placed in any incremental mode throughout about a 180° movement from full forward (to allow the camera to look down) through upright (to allow the camera to look straight ahead) and to full back (to allow the camera to look up). With this control, the camera can be used to pan in various angles using the RTR position for moving and observing left or right. For example its control movement will allow the camera to look down into a hole or look up under an object such as under a vehicle. The preferred embodiment of the present invention is to have the camera mounted in a fixed position on the boom. An alternate embodiment would be to have a servo attached to the camera mount for separate movement of the camera, although testing has found this not to be necessary.

When the RTR is in the stair-climbing mode, the clamshells (and thus the primary drive units) are locked together. A servo, located within one of the clamshells, will be activated via the remote control from the multi-channel receiver and will move the locking cam into a "lock" position to contact the suspension arm on the central axle. In this "lock" position, the central axle will rigidly parallel-lock both clamshells. This locking action will ready the RTR for the stair-climbing mode (or extreme terrain mode). To get back into the rolling mode, the servo will move the locking cam away from the suspension arm, which will put the RTR into the rolling mode position, allowing the suspension arm and central axle to rotate. It may also be desirable to place the clamshells in a lock position when moving over smooth or off camber terrain, in which case, the "lock" position can be activated.

In the stair-climbing mode, the tail boom is driven down towards the rear of the RTR and into the surface plane. Putting the tail boom into stair-climbing mode will only be possible when the clamshells are in the locked mode. In this position the camera lens will permit the camera to look 'up the stairs' or 'up the extreme terrain'. Stair-climbing mode requires an approximate 10% of total forward driving wheel torque. This will compensate for various step dimensions and also assists in the panning of the clamshells during climbing. When the forward wheels contact a stair riser, this downward action of the tail boom rotates the clamshells (parallel-locked) to rotate the rearmost wheels in an upward direction moving the locked clamshells end-over-end until the rearmost wheels rotate onto the higher stair, become the foremost wheels, and then pull the RTR upward to the next stair. This type of RTR "panning", or end-over-end, movement moves the apparatus up the stairway. Thus, the tail drive motor functions to move the tail axle block, and thus the tail boom in a radial movement about the central axle and downward to the ground surface in assisting the RTR in climbing stairs. The tail drive motor is connected to the axle block via bevel gears and will move the central axle, and thus the tail boom, upon command. When climbing stairs the tail boom is down and the camera is mounted to look "up" the stairway. The camera lens is such that the wide angle of view allows the observation of the RTR from behind the locked clamshells.

The upper tail boom section contains a tail boom pod to house an infrared camera (or other type camera) and other aforementioned equipment. In the preferred embodiment of the present invention the camera is rigidly mounted to the boom pod. In an alternate embodiment, the camera is gimbaled mounted within the tail boom pod. The tail boom pod, which sits on the end of the tail boom, contains a clear enclosure through which the camera can take, and transmit, visual images. The camera will pan straight out with about a 110° field of view from the boom. When in stair-climbing mode it will be able to view along the tail boom towards the clamshell base, which would allow visual feedback upward along the stairs. Horizontal scanning (or panning) left to right is accomplished by turning the RTR itself. The RTR can also be turned in a very small pivot via skid steering. That is, one drive motor can lock one set of clamshell wheels in place while moving the other set in a forward or reverse direction. The RTR can also rotate in a small circle by driving one clamshell in a forward motion and the other clamshell in a reverse motion. Normal steering is accomplished by moving one wheel drive assembly faster (or slower) than the other wheel drive assembly. In the stair-climbing mode, the camera lens field of view will allow the camera to look down along the tail, allowing site along the platform and what lies ahead. In the stair-climbing mode both clamshells are locked in place, and the tail boom will be in a low position with a downward force relative to the movement of the locked clamshells. As previously mentioned, an alternate embodiment would be to gimbaled-mount the camera using servo controls for its movement although preliminary tests have shown this not to be required.

There are two switches that are used for stair climbing. One switch will "lock" the clamshells. As aforementioned, it may be desirable to lock the clamshells when moving over smooth or off camber terrain when not in stair climbing (S/C) mode. The second switch "S/C mode" will move the boom into its S/C assist mode. The second switch would only activate the boom if the first switch is activated, that is, if the clamshells are in a "locked" position. As there is a time delay, which is required to lock the clamshells prior to activating the tail boom into stair-climbing mode, other alternate embodiments of the present invention could put an electrical or mechanical time delay between locking the clamshells and activating the tail boom. With such an electrical or mechanical delay, it would be possible to have one switch control stair-climbing mode by sequencing the locking of the clamshells followed by the tail boom activation.

The tail boom section will feed back a visual image from the camera along with an audio signal via an audio/video transmitter located in the tail boom pod. An optional feature of the RTR would be to have a receiver and microphone also located in the tail boom pod allowing for two-way communications with any person(s) in the vicinity of the RTR.

A non-tethered remote control with a visual display, speaker, camera servo control, joystick (or other) and motor controls, optional microphone, will allow field personnel full remote control of the RTR in reconnaissance missions. The remote control will have a clamshell locking mode switch to lock the clamshells prior to stair-climbing mode (clamshells may also be locked for smooth terrain) or unlock the clamshells when in a rolling mode. The remote control will also have a stair-climbing mode switch to place the tail boom in 'climbing assist' mode for RTR stair-climbing. The remote control will also have a power enable switch and a battery charger connection for recharging its internal batteries.

In the preferred embodiment of the present invention, the tail boom a fixed length boom and is removable for both storage or packing. In an alternate embodiment of the present invention, the tail boom can be an "extendable" boom with an additional drive system to control the tail boom extension length.

Other alternate embodiments can include optional sensors to be mounted on the tail boom, within the tail boom pod, or within either or both clamshells for sensing toxic gasses, air quality, temperature, etc. Yet other alternate embodiments can contain a speaker in the tail boom and a microphone in the remote for two-way communications. It should be noted that other devices, sensors, manipulators, tools or other payload can be added as needed to fulfill a mission requirement.

The previously described RTR is a symmetric design and, thus, can operate without regard to a "top-to-bottom" function that is with either side up if it is flipped over or as it moves end-over-end when in stair climbing mode.

The RTR, with the tail boom rotated back and the camera looking upward; can easily fit under a vehicle for inspection of potentially hazardous conditions.

The RTR can be manufactured at low cost due, has very few parts and can, thus, be deployed with a destructive payload if necessary. The RTR can be constructed in various sizes to accommodate design or mission requirements.

The RTR provides a reconnaissance apparatus that is small in size yet strong and ruggedly built to traverse wide variety of terrain more efficiently than single locomotion robots and is able to stair climb or climb a heavy and rugged slope. The RTR is environmentally packaged to hold up to weather, mud and other harsh environments. It can be easily carried within the trunk of a vehicle or manually carried into a site.

The ability to carry audio, visual, sensors, and/or a payload across rugged terrain and up a stairway gives a reconnaissance team great flexibility and optimized safety in carrying out a mission allowing for protection of the team by sending the RTR ahead in order to reconnoiter an area. As previously discussed, audio equipment can be attached to allow communication as required with unfriendly forces, trapped individual(s) or other needs.

As a mission robot, the RTR can be carried and can be deployed from a larger robot. A plurality of RTRs can be deployed for reconnoitering a larger area.

The RTR is designed to be manually transported in a backpack-carrying package such that the RTR can be easily unpackaged for reconnaissance. The control unit can be kept in a backpack while allowing the individual to operate the RTR while the control individual is in a mobile mode.

The RTR can be manufactured in various sizes depending on requirements. A typical packaging size of the clamshell area (without the boom attached) for normal stair-climbing and extreme terrain would be in the range of about 19.5" in width, 13.5" in length and about 5.25" in height for the preferred embodiment of the present invention with a tail boom of about 20" from the center of the axle. The weight would be about 15.5 pounds. A typical control unit would be weigh about 8.5 pounds or less. Thus the total weight would be 24 pounds or less, which is easily transportable by backpack. A control unit would easily fit within a 19" by 12" by 7" carrying pack volume. The tire diameter in the preferred embodiment is about 5.25".

A smaller size RTR can be built for specific needs. For example, a lighter weight (8.5 pound) unit with dimensions of about 10"×7"×3" could be manipulated for reconnaissance within very small areas. Larger RTRs could also be built for other required conditions.

The RTR will provide law enforcement agencies, search and rescue teams, swat teams, soldiers, and other agencies a flexible tool to optimize the safety of the team in conditions that warrant a send-ahead robot to reconnoiter an area.

BRIEF DESCRIPTION OF THE DRAWINGS

FIGS. 1A, 1B are a side perspective views showing a configuration of a prior art robot.

FIGS. 9a through 9g depict the RTR approaching and then climbing a set of stairs.

Before explaining the disclosed embodiment of the present invention in detail, it is to be understood that the invention is not limited in its application to the details of the particular arrangement shown, since the invention is; capable of other embodiments. Also, the terminology used herein is for the purpose of description and not of limitation.

DETAILED DESCRIPTION OF DRAWINGS

FIGS. 1A, 1B is an isometric perspective view showing a configuration of a prior art robot 200 with two independently moving sides 204, 205. Typical prior art robots can employ camera(s) 201 for visual feedback, have a top surface 203 and a bottom surface 202, and can carry a payload on top surface 203 or internally. A limitation of prior art robot 200 is that it can only operate in a position such that top surface 203 is always "up" due to wheel clearance. Another limitation of robot 200 is that it cannot climb stars, and is limited in camera feedback due to height from ground, and may typically be too heavy or cumbersome to be carried. If robot 200 were to be flipped "head-over-heels", it would be inoperable.

Figure 2:
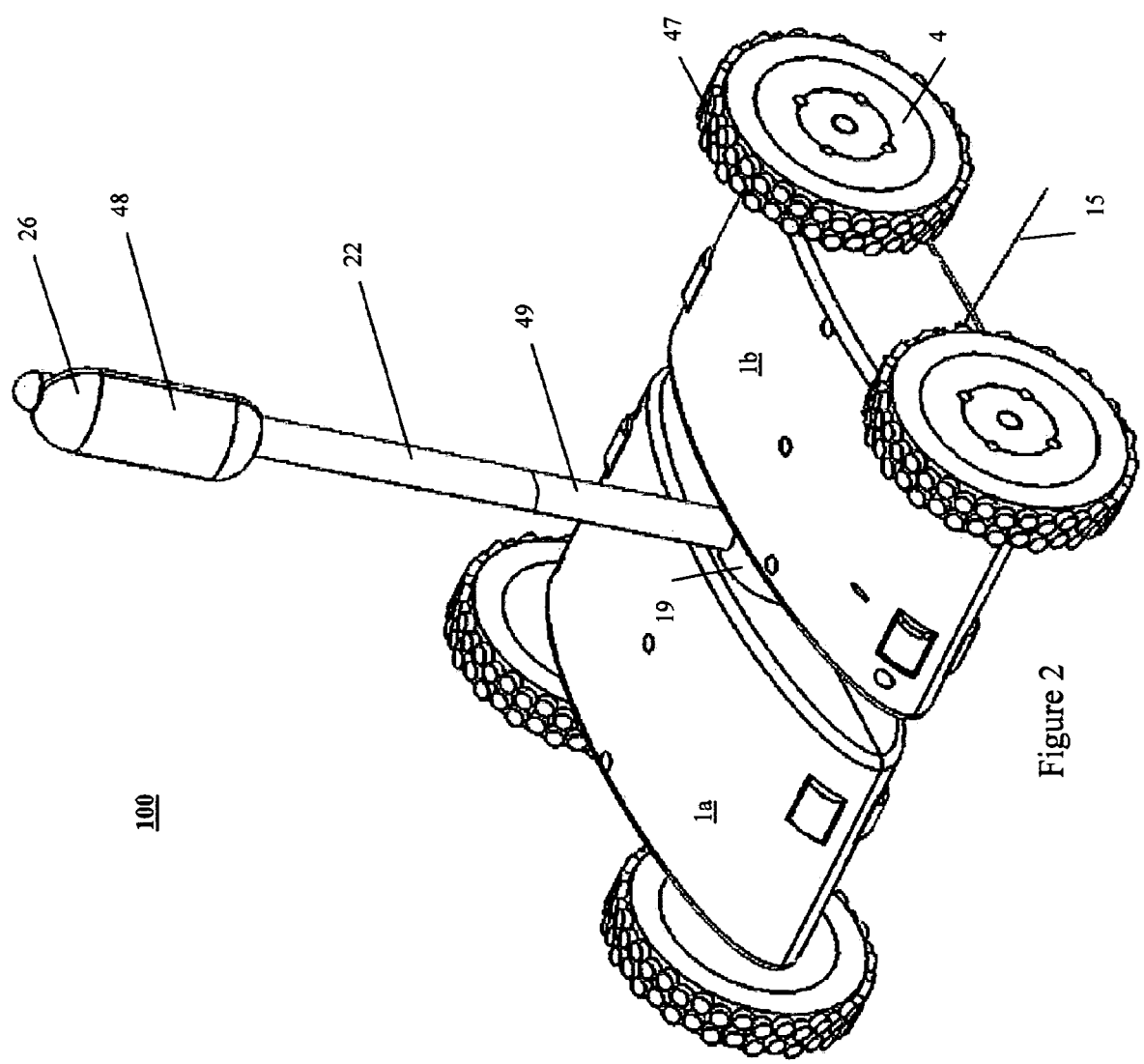
FIG. 2 is a side perspective view of the RTR, the preferred embodiment of the present invention.

FIG. 2 is a side perspective view of RTR 100, the present invention. RTR 100 consists of two clamshell sections 1a, 1b, which are symmetrical and nearly identical in design and manufacturing. Each clamshell section 1a, 1b, consists of top and bottom sections that are also identical parts. Thus, only one part number is manufactured to create both clamshells 1a, 1b. Four wheels 4 are mounted to RTR 100 clamshells, each wheel 4 having outer wheel treads 47. The tail boom consists of upper tail boom section 22 and lower tail boom section 49. Lower tail boom section 49 connects to central axle hub block 19. Tail boom pod 26, with clear enclosure 48, holds various apparatus such as a camera, audio/video camera antenna, transmitter, along with optional items such as a microphone, payload, speaker, sensors, etc.

Although not limited to specific dimensions or weight, RTR 100 clamshells can easily be designed to fit within a one by one foot length and width and weigh less than eight pounds. With a sectional tail boom for separation during transport, it is easily carried to a reconnaissance site. Base load antenna 15 receives input command signals from the remote control. Base load antenna 15 could also be packaged in other locations such as at the top of the tail boom. It should also be noted that tire configurations, other than that depicted, could also be employed such as smooth surface, knobby, or all terrain tire surfaces.

An alternate embodiment of the present invention could also employ a magnetic tire surface to assist the RTR with the ability to navigate on the undersurface of a ferrous type material such as climbing over and under a tank.

Figure 3:
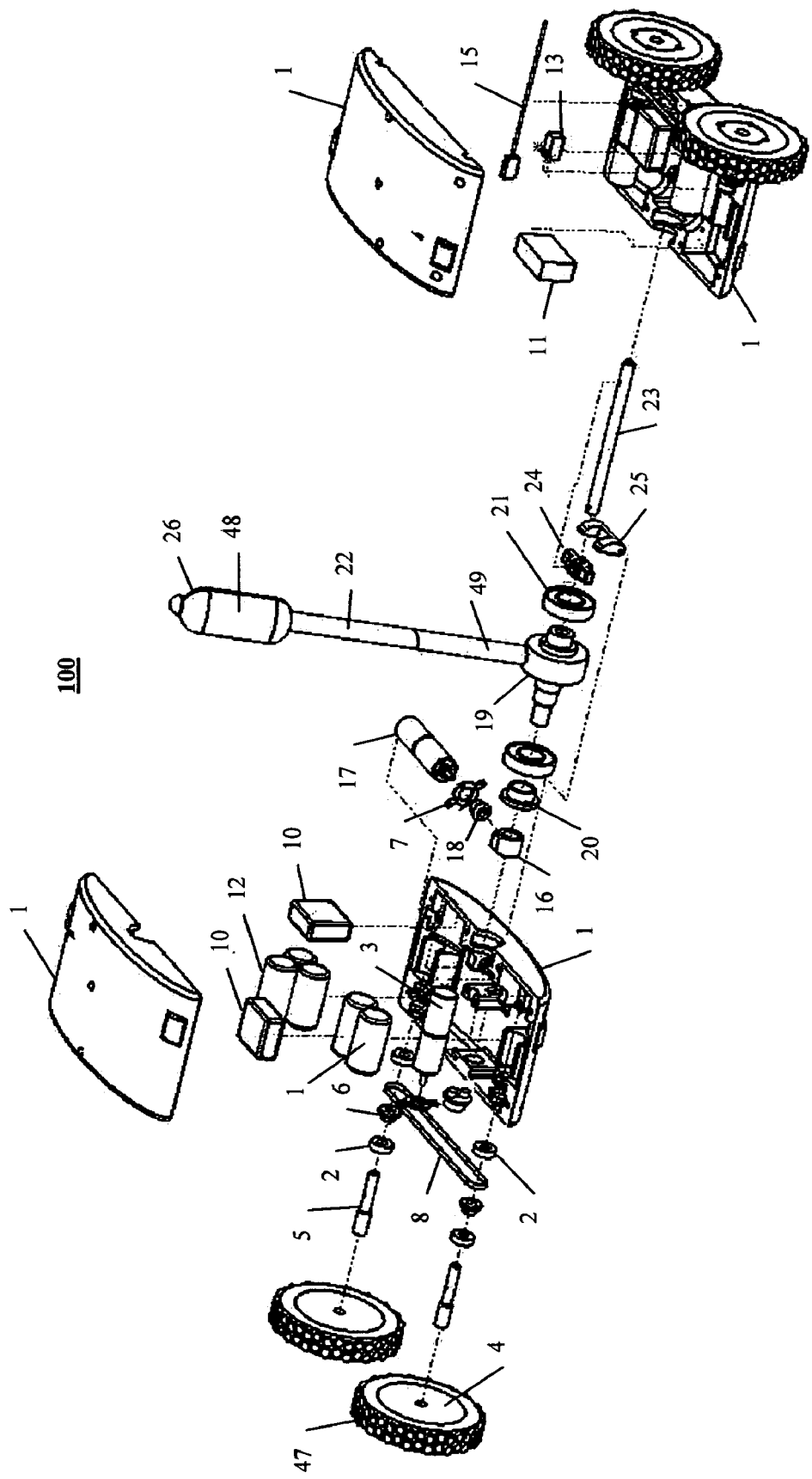
FIG. 3 is a front perspective exploded view of the RTR shown above in FIG. 2.

FIG. 3 is a perspective blow up view of RTR 100 shown above in FIG. 2. Each wheel 4 connects to respective wheel axle 5. Bearings 2 support each wheel within the clamshell. Mounted on each wheel axle 5 is belt gear 6 for driving wheel drive belt 8. Wheel drive motor 3 drives belt gear 6, and thus wheel belt 8. Wheel belt 8 could be fabricated with fiber, rubber, metal or other various materials. Clamshell half sections 1 are all identical parts and can be made of materials such as nylon or other polymer type materials. Ten batteries 12 are serially coupled and packaged within the clamshells. Batteries employed in the preferred embodiment are 1.2 vdc (12 vdc total) although other power configurations are possible. Motor controllers 10 are individually coupled to multi-channel receiver 11, through which controls to all motors and cam lock servo 13 are performed. Upper tail boom section 22 and lower tail boom section 49 connect to central axle hub block 19. Tail boom pod 26 attaches to upper tail boom section 22, and has clear enclosure 48. The tail boom (tail boom sections 22, 49) is controlled in its rotational movement by tail motor drive 17, and bevel gear 18 connected to drive gear 20 via central bearing connection 16. Tail motor drive 17 is attached to clamshell half section 1 via motor bracket 7. Interconnect central axle 23 is hollow to allow wiring inter-connectivity between both clamshells. Interconnect central axle 23 is rigidly affixed to one clamshell (leftmost clamshell shown) and has suspension arm 24 affixed to its opposite end. Suspension arm 24 allows one clamshell to rotate freely with respect to the other clamshell within about a 45-degree rotation. This movement allows RTR 100 to move about rugged terrain. Lock cam 25 is pivotally attached to the rightmost clamshell shown and allowed to pivot to an "up" or "down" position via cam lock servo 13 control. When in an "up" position lock cam 25 (shown in an up position) locks suspension arm 24, and thus interconnect central axle 23. This "up" lock position locks both clamshells together and is used in the "stair-climbing" mode. When lock cam 25 is in the "down" position (rolling mode), the clamshells can rotate with respect to one another for moving over rugged terrain. It should be noted that various lock cam configurations could be employed to accomplish the same locking function on the cams. For example, a linear cam design (not shown) could easily perform the same locking function. Slip ring bearings 21 allow rotation of central axle hub block 19 to be independent of interconnect central axle 23. Cam lock servo 13 controls the position of lock cam 25. Base load antenna 15 receives control signals from the remote control device (not shown).

Figure 4:
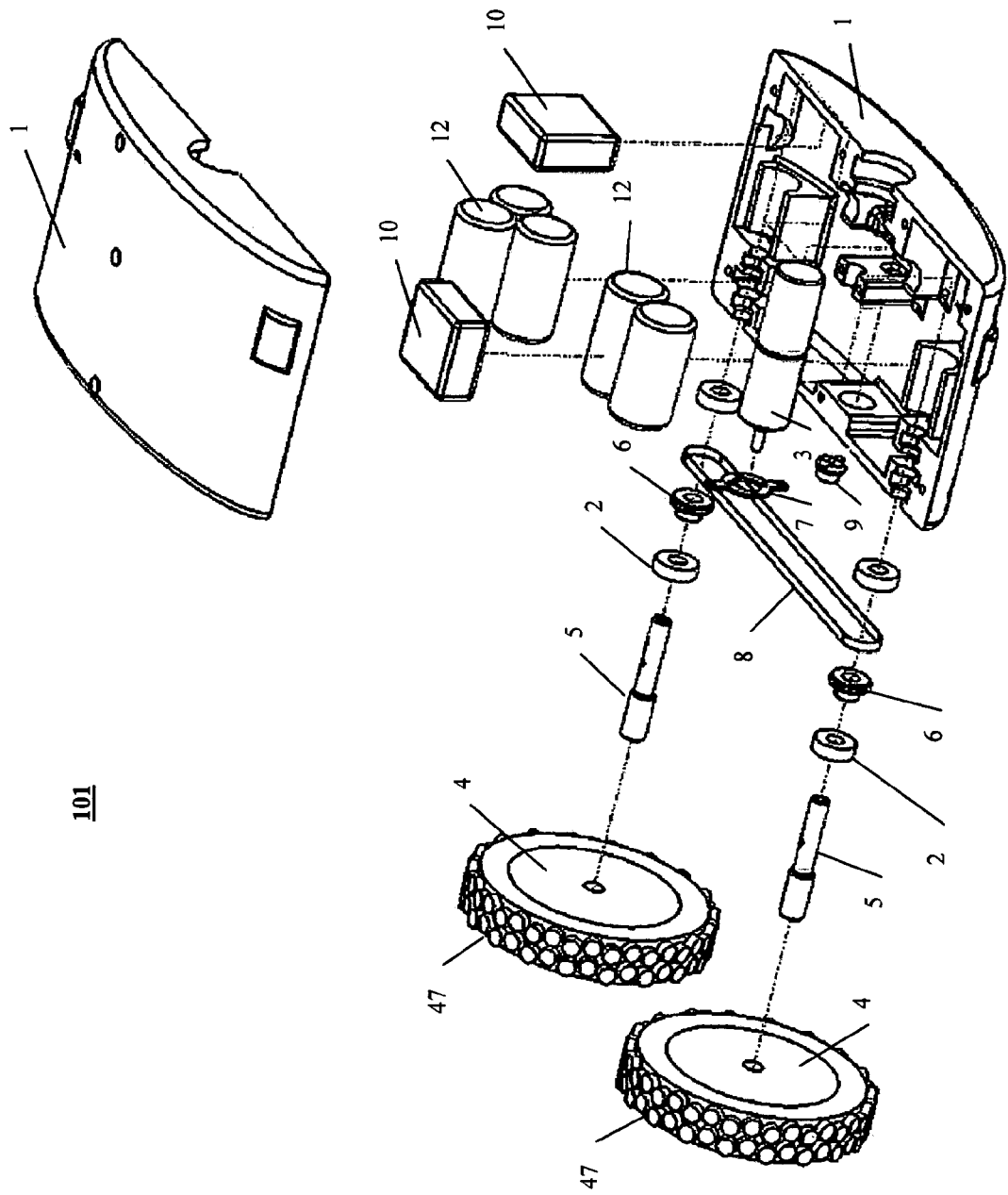
FIG. 4 is a further front perspective exploded view of left most clamshell section from FIG. 3.

FIG. 4 is a further front perspective blow-up view of one clamshell section 101, the leftmost clamshell depicted in FIG. 3 above, showing the wheels and wheel drive mechanisms. Each wheel 4 has outer wheel treads 47 and each wheel 4 connects to respective wheel axle 5. Bearings 2 sit into clamshell half 1 cavities to support wheel axle 5. Mounted on each wheel axle 5 is belt gear 6, which drives wheel drive belt 8. Wheel drive motor 3 is mounted within lower clamshell half 1 via motor bracket 7 and directly drives one belt gear 6. Belt tensioner 9 allows belt tension adjustment. Clamshell half 1 sections 1 are identical parts and can be made of a nylon or polymer type or other such material. Batteries 12 are serially coupled and packaged within the clamshells. Motor controllers 10 are coupled to a multi-channel receiver in the other clamshell section (not shown).

Figure 5:
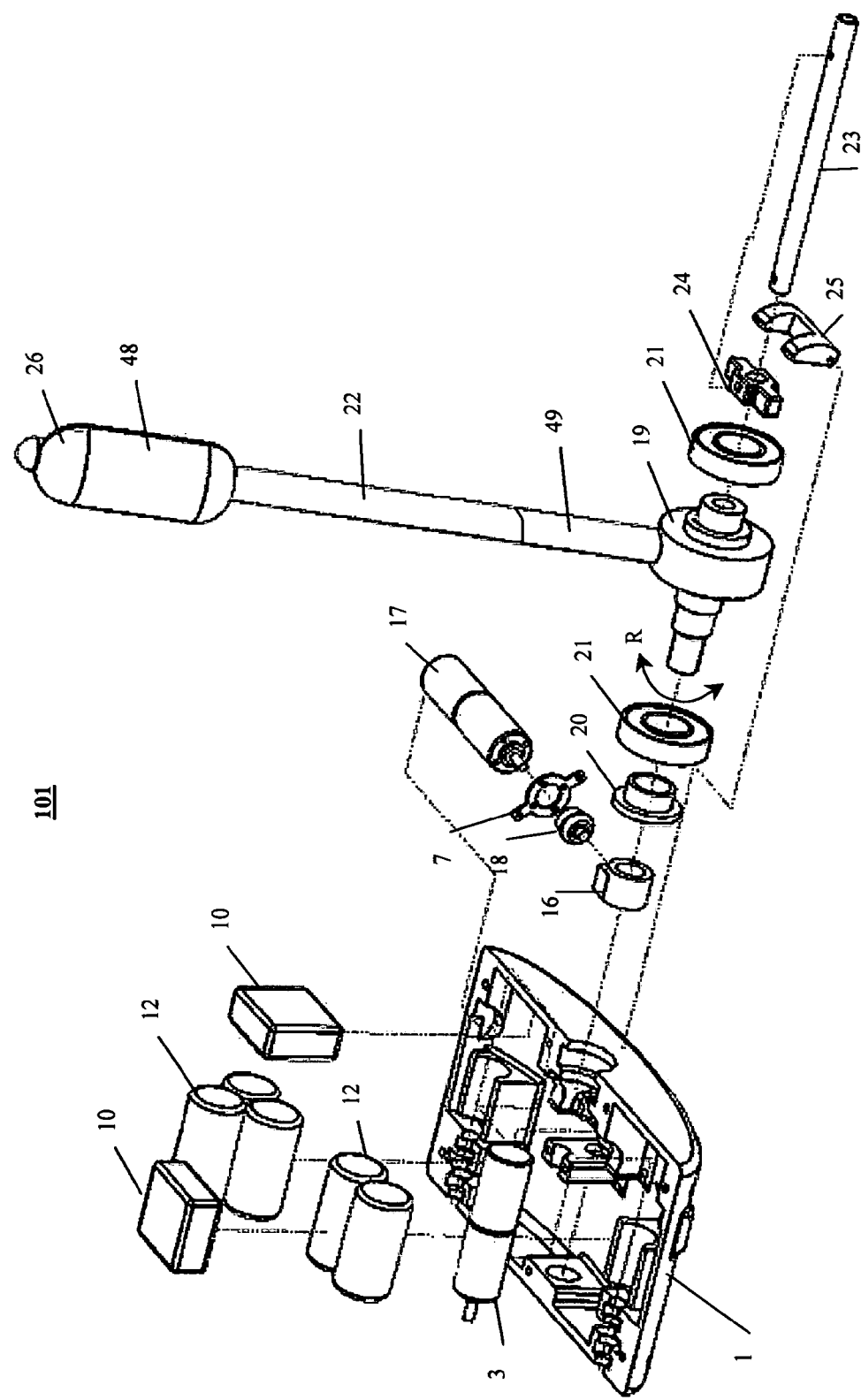
FIG. 5 is a further front perspective exploded view of the tail boom and part of the leftmost clamshell from FIG. 3 above.

FIG. 5 is a further front perspective blow-up view of the tail boom sections and rightmost part of the leftmost clamshell 101 from FIG. 3 above. Upper tail boom section 22, which has clear enclosure 48, connects to lower tail boom section 49, which in turn connects to central axle hub block 19. Tail boom pod 26 attaches to upper tail boom section 22. The tail boom is controlled in its rotational movement R by tail motor drive 17, and bevel gear 18 connected to drive gear 20 via central bearing connection 16. Tail motor drive 17 connects to half clamshell section a via motor bracket 7. Interconnect central axle 23 is hollow to allow wiring (not shown) inter-connectivity between both clamshells. Interconnect central axle 23 is rigidly affixed to one clamshell (leftmost clamshell shown) and has suspension arm 24 affixed to its opposite end. Lock cam 25 is pivotally attached to the rightmost clamshell (not shown) and allowed to pivot to an "up" or "down" position via cam lock servo 13 control (not shown). Suspension arm 24 allows one clamshell to rotate freely with respect to the other clamshell within about a 45-degree rotation when lock cam 25 is not engaged. This movement allows RTR 100 to move about rugged terrain. When in an "up" position lock cam 25 (shown in an up position) locks suspension arm 24, and thus interconnect central axle 23. This "up" lock position locks both clamshells together and is used in the "stair-climbing" mode. When lock cam 25 is in the "down" position (rolling mode), the clamshells can rotate with respect to one another for moving over rugged terrain. Slip ring bearings 21 allow rotation of central axle hub block 19 to be independent of interconnect central axle 23. Slip ring bearings 21 also allow power to be transferred and distributed into the rotatable tail boom. Soldering or welding one power wire connection into the inner bearing hub and allowing it to transfer to another conductor, which is soldered/welded to the outer bearing hub, through the ball bearings, accomplishes this. In such a manner bearings 21 each respectively transfer either a plus or a minus dc-power conductor into the tail boom. An internal boom electrical connector (not shown) allows tail boom upper section 22 and tail boom lower section 49 to be physically disconnected. Recharging of batteries can be accomplished via the electrical connector, attached to tail boom lower section 49.

Figure 6:
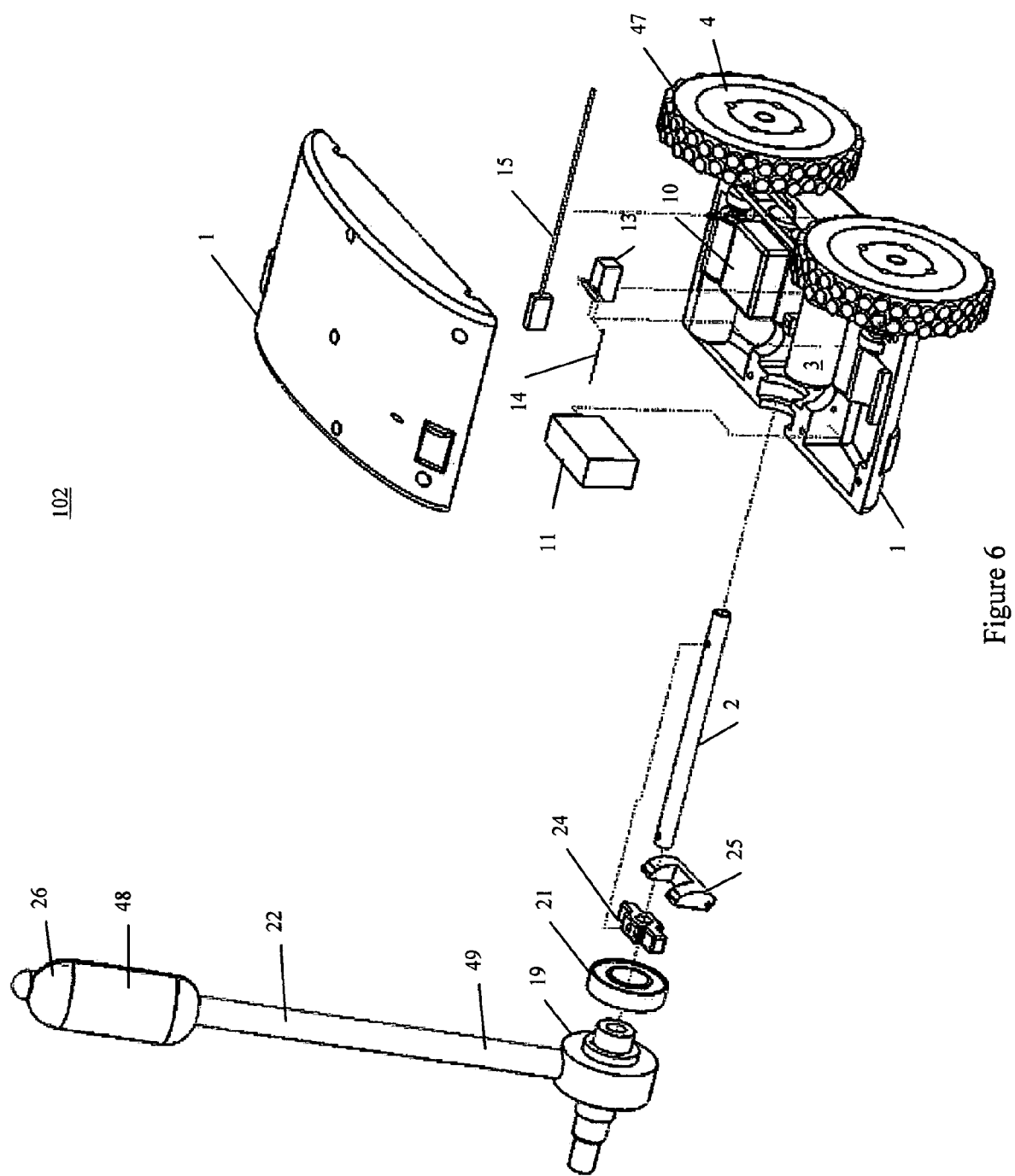
FIG. 6 is a further front perspective exploded view of the tail boom and the rightmost clamshell section from FIG. 3 above.

FIG. 6 is a further front perspective blow-up view of the tail boom and the rightmost clamshell section 102 from FIG. 3 above. Interconnect central axle 23 is rigidly affixed to the leftmost clamshell floats within the rightmost clamshell and has suspension arm 24 affixed to its rightmost end. It allows one clamshell to rotate freely with respect to the other clamshell within about a 45-degree rotation. This movement allows RTR 100 to move about rugged terrain. When in an "up" position lock cam 25 (shown in an up position) locks suspension arm 24, and thus interconnect central axle 23. This "up" lock position locks both clamshells together and is used in the "stair-climbing" mode. When lock cam 25 is in the "down" position (rolling mode), the clamshells can rotate with respect to one another for moving over rugged terrain. Bearings 21 allow rotation of central axle hub block 19 to be independent of interconnect central axle 23. Cam lock servo 13 controls the position of lock cam 25 by way of servo link 14. Base load antenna 15 receives control signals from the remote control device (not shown). Wheel drive motor 3 drives wheels 4 as previously described. Multi-band receiver pack 11 receives remote signals and sends separate control signals to each motor controller 10 and cam lock servo 13.

Figure 7:
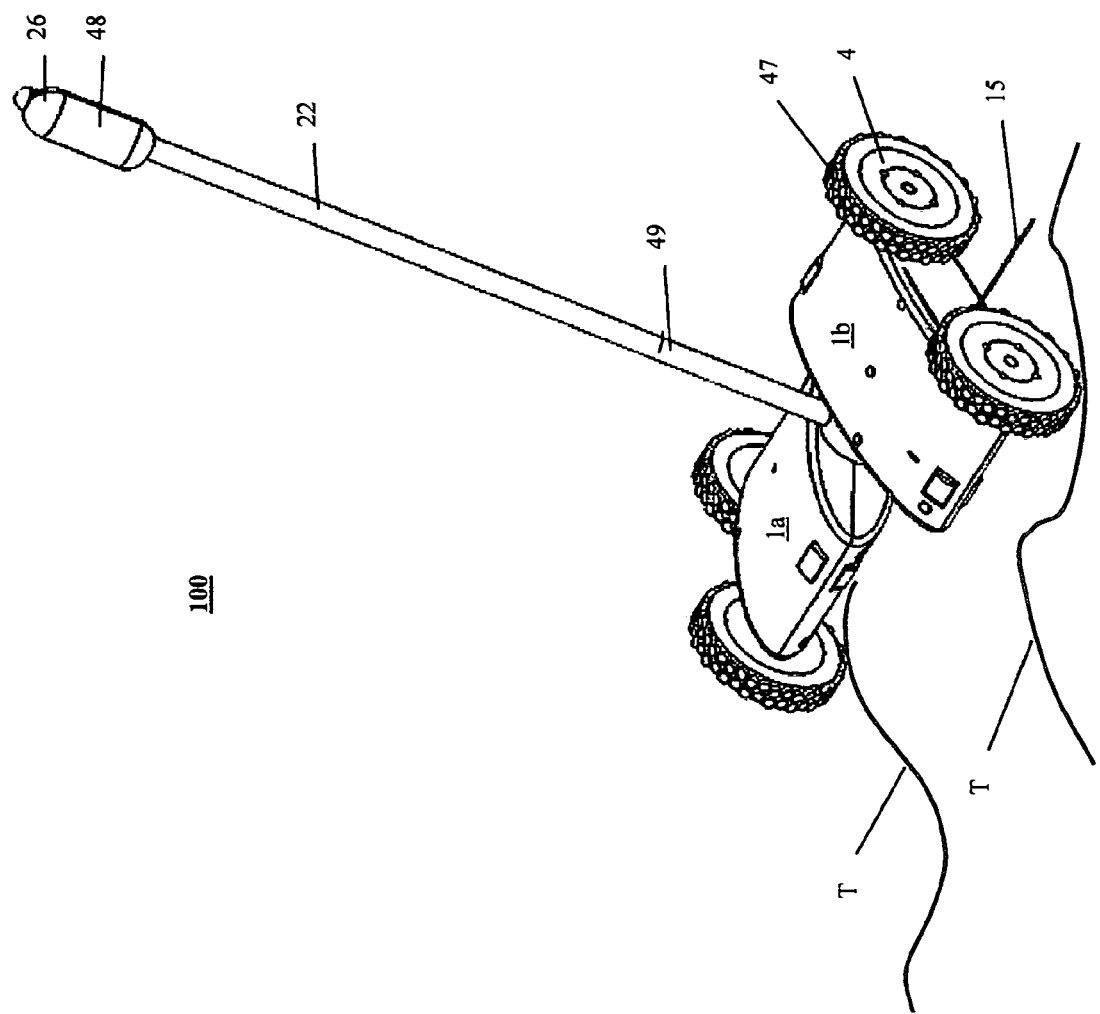
FIG. 7 is a front perspective view of the RTR in motion over rugged terrain.
Figure 8A:
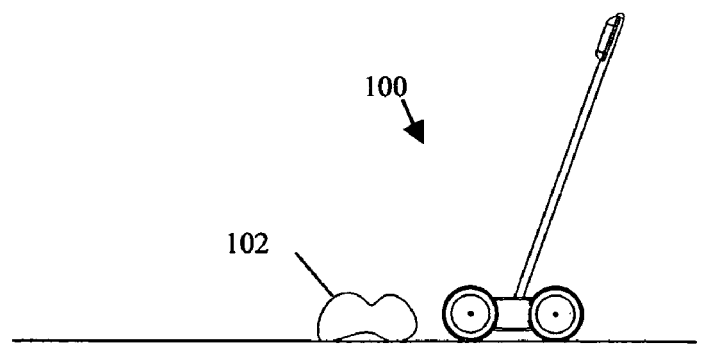
FIGS. 8a through 8e depict the RTR moving over an obstacle in rugged terrain.
Figure 8B:
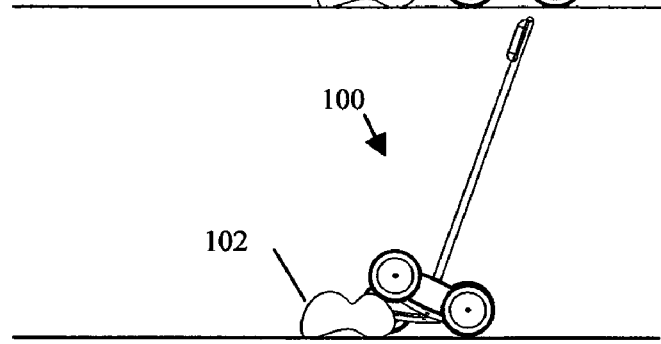
Figure 8C:
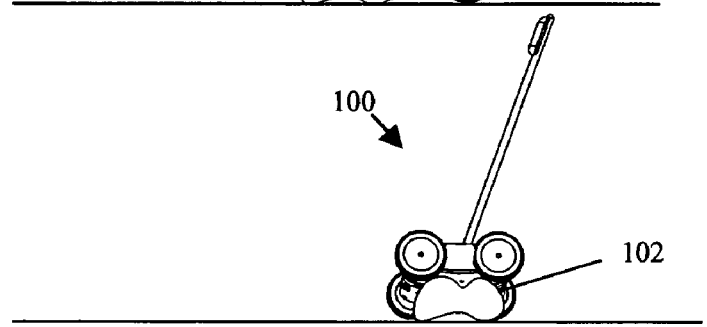
Figure 8D:
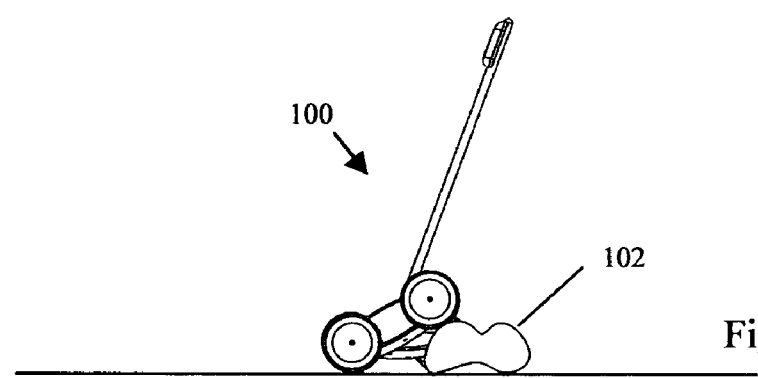
Figure 8E:
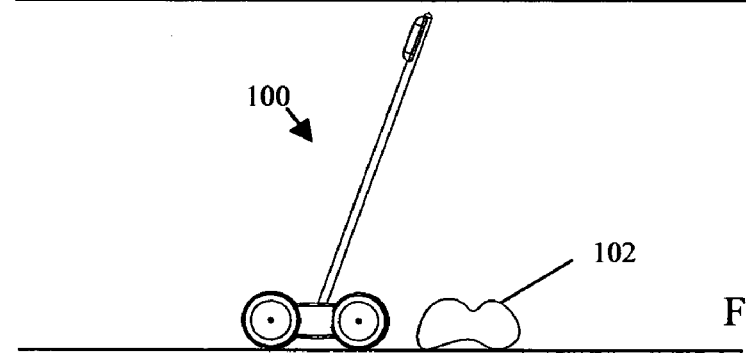

FIG. 7 is a front perspective view of RTR 100 in motion over rugged terrain. As wheels 4 move over rugged terrain T, each individual clamshell section 1a, 1b is allowed to rotate with respect to the other. The tail boom is moved to an upright position (shown) allowing the boom mounted camera within tail boom pod 26 to send images as seen through clear enclosure 48. Outer wheel treads 47 prevent slippage of tires 4. Load antenna 15 receives control signals from the remote control device (not shown).

FIGS. 8a through 8e depict RTR 100 moving over obstacle 102 in rugged terrain. As RTR 100 approaches obstacle 102 in rolling mode, FIG. 8a, the left clamshell wheel sequentially rotates up, on top of, and over obstacle 102 (FIGS. 8b, 8c, 8d, 8e). One clamshell section can be seen rotating with respect to the opposite clamshell section as RTR 100 climbs over obstacle 102 in rolling mode. The tail boom is in an up position to allow maximum viewing of what lies ahead.

FIGS. 9a through 9g depict RTR 100 of the present invention approaching and then climbing stairway 103. With RTR 100 placed in a "stair-climbing" mode, both clamshells are locked parallel to one another as previously described. The camera is panned to look down the tail boom. The tail boom is controlled in a downward position and with a continued downward boom force F applying pressure of the tail boom into surface S. During the stair climbing process, the wheels will simultaneously slowly drive forward, keeping a positive forward force required for the stair climbing motion. AS RTR 100 approaches the base of stairway 103 (FIG. 9a) the set of RTR 100 foremost wheels 104 encounter step one riser (FIG. 9b) of stairway 103. Downward tail boom force F and RTR 100 foremost wheels 104 traction lift the rear wheels 105 off surface S (FIG. 9c) in a rotational end-over-end movement until the rearmost wheels 105 flop over to the top of step one (FIG. 9d), at which time rearmost wheels 105 become the forward drive wheels. Wheels 105 then provide traction and, along with continued downward tail boom force F, pull the opposite set of wheels 104 upward along stairway 103 (FIG. 9e) in an end-over-end rotational manner until wheels 105 (now forward) move RTR 100 to the base of step two riser (FIG. 9f) and wheels 104 rotate to contact the top of step two (FIG. 9g) pulling RTR up to step two. RTR 100 will continue to climb stairway 103 in the aforementioned end-over-end manner until stairway 103 is traversed, at which time RTR 100 can be placed into "rolling" mode as previously described. When RTR 100 is going down a stairway, it can be placed in either rolling or stair-climbing mode.

Figure 10:
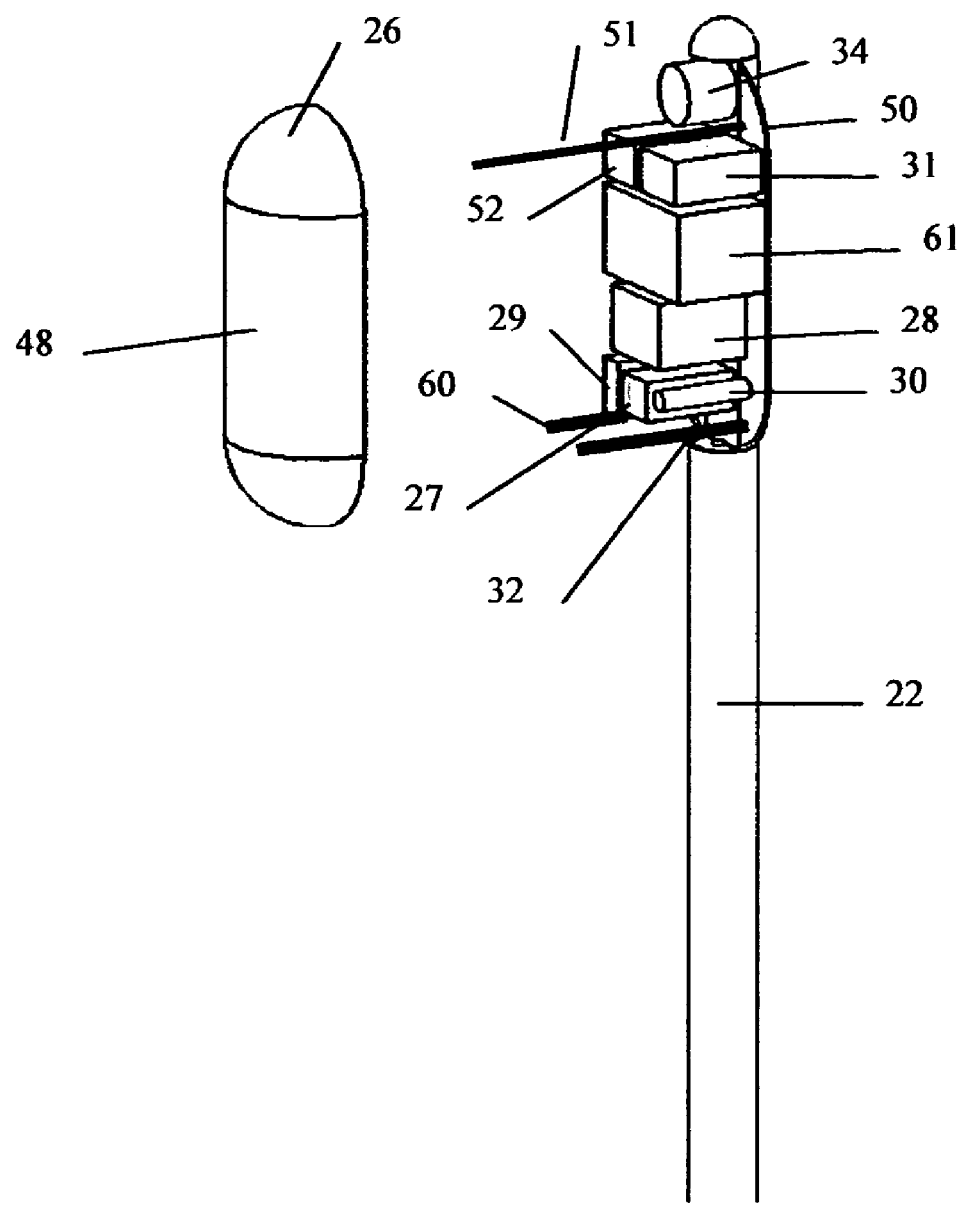
FIG. 10 is an illustrative view of the RTR upper tail boom with tail boom pod and tail boom pod contents.

FIG. 10 is an illustrative view of RTR 100 upper tail boom 103 and tail boom pod 26 contents. Pod mounting bracket 50 attaches to upper tail boom 22, has mounting positions for various equipment, and accepts pod 26, which has clear enclosure 48. Boom receiver antenna 51 receives various robot control signals and transfers them to boom receiver pack 52. An alternate embodiment would allow camera 27 to be directionally controlled with camera gimble servo 29.

In the preferred embodiment of the present invention, camera 27 is rigidly mounted to the tail boom mounting bracket 50 and camera gimble servo 29 is not required. Camera 27 transmits video signals via audio/video (A/V) transmitter 28 and A/V transmitter antenna 32. Likewise microphone 30 transmits audio signals via audio/video (A/V) transmitter 28 and A/V transmitter antenna 32. Optionally pod 26 can contain a speaker 34 to receive audio signals from the remote control through audio receiver antenna 60 and A/V receiver pack 61 in order to facilitate a two-way communication function. There is also room to package other equipment 31, such as payloads, sensors to detect toxins, or other type sensors or other equipment as required by situational needs. An optional payload receive antenna (not shown) could be added to receive signals for any payload activation as required. As previously discussed, use of a wide angle lens, left to right movement of RTR 100 and incremental "up" or "down" movement of the boom has shown that visual observation can be adequately done without a separate camera gimble by use of a camera lens with about 110° field of vision. It should be noted that although the tail boom pod with camera is shown mounted at the top of the tail boom, it could also be mounted at various positions along the tail boom. The camera could also be placed on or in the clamshell similar to the prior art camera mount shown in FIG. 1.

Figure 11:
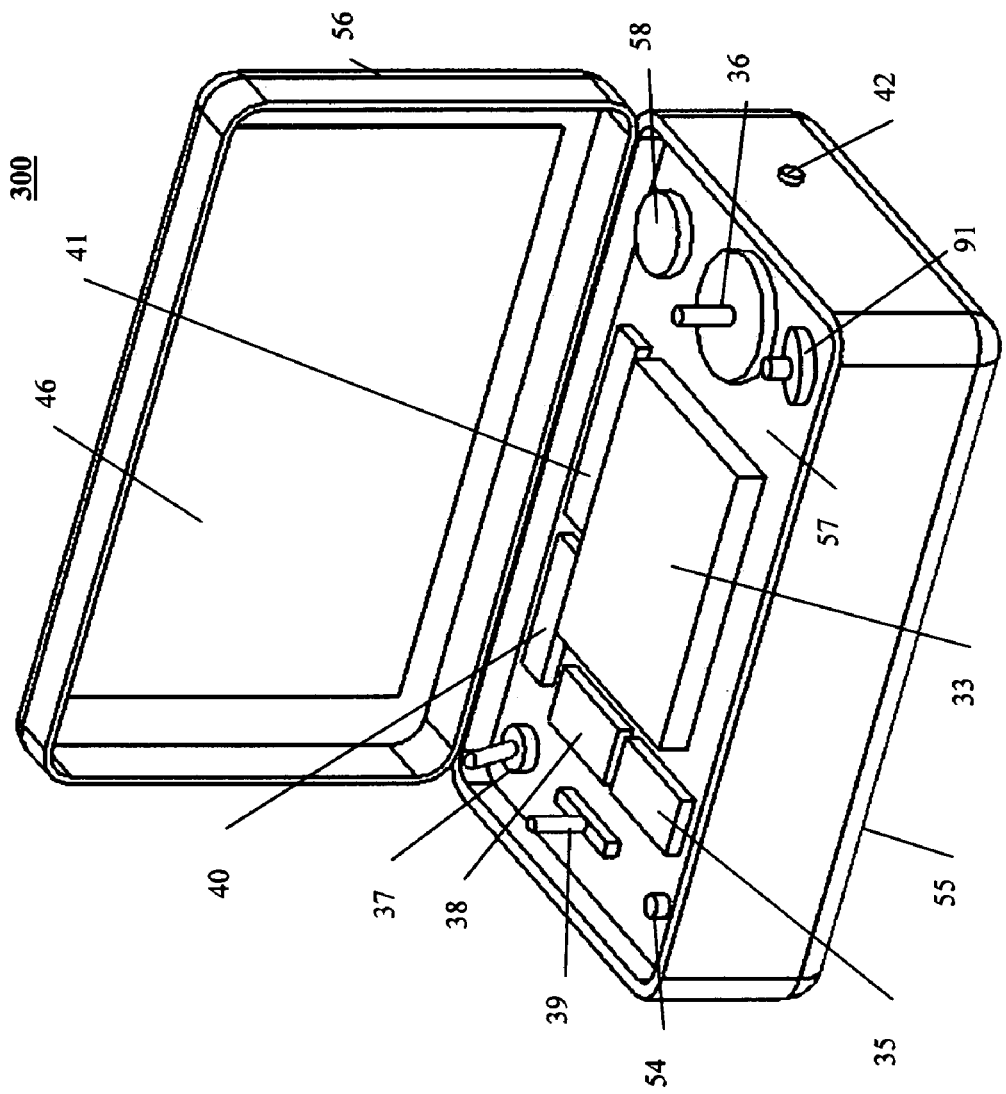
FIG. 11 is a front perspective view of the RTR remote control unit (RCU) packaged in an individual encasement, an alternate packaging embodiment.

FIG. 11 is a front perspective view of RTR remote control unit (RCU) 300 packaged in an individual carrying case, an alternate embodiment of the RCU packaging of the present invention. RCU cover 56 has an instructional placard 46 mounted inside. RCU base 55 has a carrying strap connection 42 on both sides and contains all of the RCU 300 electronics. Surface plate 57 contains power activation switch 62, A/V receiver pack 38, and command transmitter 35. Joystick control 36 controls the speed and direction of RTR 100. Clamshell lock/unlock switch 91 will 'lock' or 'unlock' the clamshells for stair-climbing or rolling modes respectively. Clamshells must be 'locked' prior to activating the boom when entering stair-climbing (S/C) mode. S/C switch 37 will move the tail boom down into climbing assist mode when in one position or allow it to be controlled by boom control switch 39 in its other position. RCU speaker 58 allows the user to listen to transmitted RTR audio signals. Battery charger connection 59 allows remote battery charging capabilities of internal battery packs. If RCU 300 is optionally equipped for two-way communication with RTR 100 then RCU microphone 54 and control/audio transmitter 40 are included. Area 41 is reserved for payload control or activation switches. Any additional sensor information received would be displayed on visual monitor 33 as overlay information over the visual signal. RCU 300 is non-tethered and controls RTR 100 via command signal transmission. In an alternate embodiment a camera gimble control switch would also be included to allow remote camera control.

Figure 12:
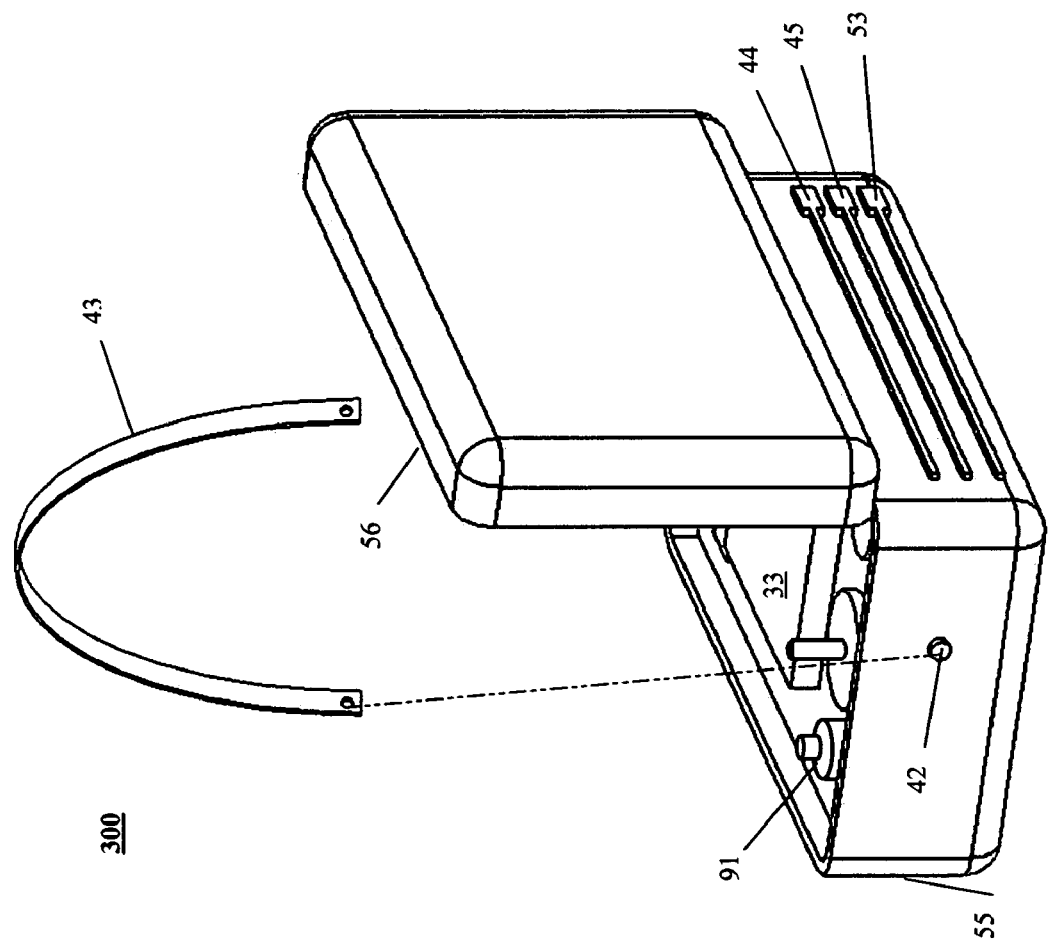
FIG. 12 is a rear perspective view of the RCU shown in FIG. 11, an alternate packaging embodiment.

FIG. 12 is a rear perspective view of RCU 300 shown above in FIG. 11. RCU carrying strap 43 attaches to carrying strap connection 42 on RCU base 55. At the rear of RCU base 55 are located three antennae; RCU audio transmitter antenna 44 for audio communications to the RTR tail boom pod; RCU A/V receiver antenna 45 to receive A/V signals from the RTR pod; and RCU base load antenna 53 to transmit control signals to the RTR clamshell base. With RCU cover 56 down, RCU 300 is easily transported from one location to another. RCU 300 thus allows personnel to directly control RTR 100 from a remote location and allow RTR 100 to act as a reconnaissance vehicle in reconnoitering an area of concern, including the ability of climbing stairways, traversing over rugged terrain, two-way communicating, carrying payloads, sensors, etc.

Figure 13:
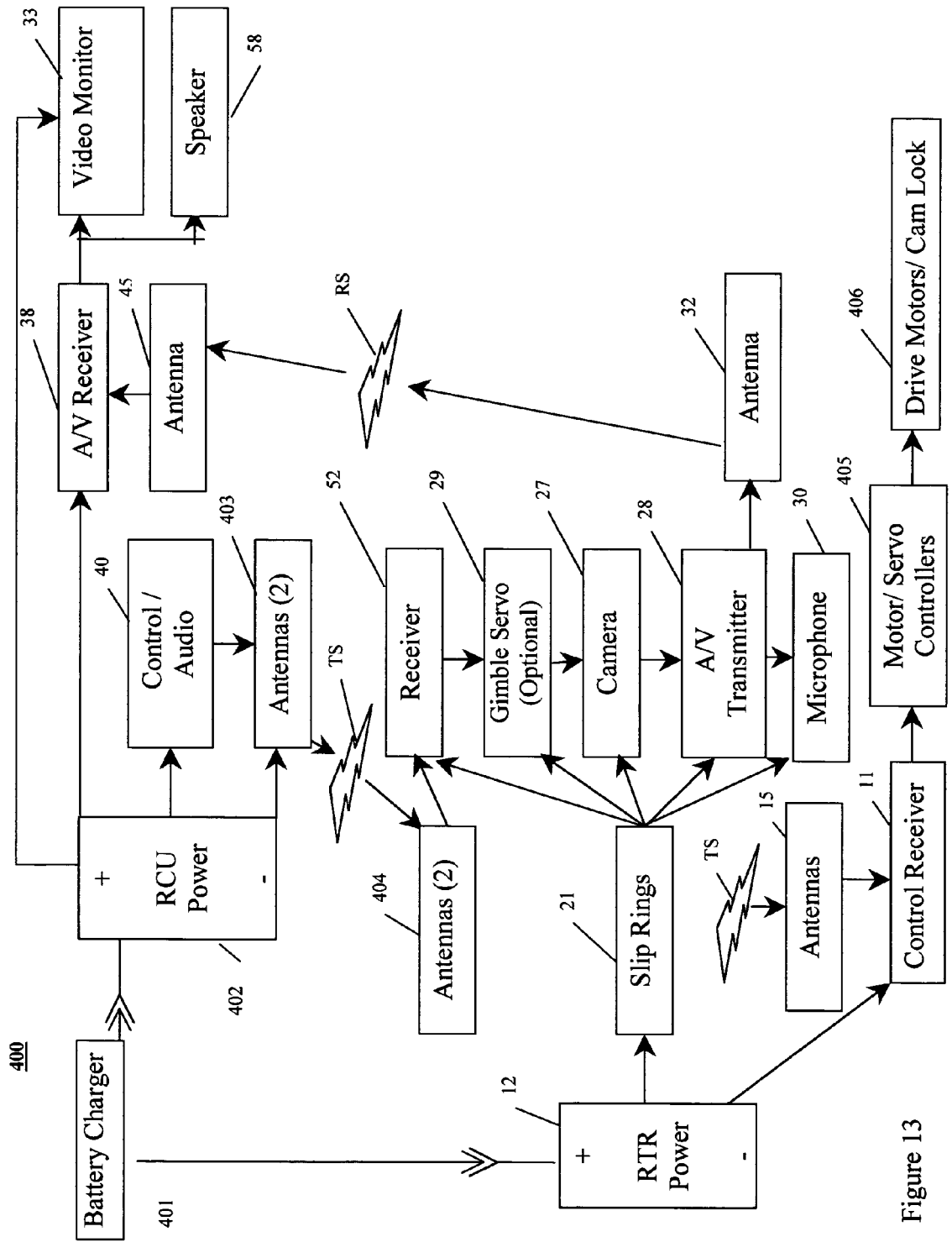
FIG. 13 is a block diagram of the electronics in the RTR and the RCU.

FIG. 13 is a block diagram 400 of the electronics in RTR 100 and RCU 300. Battery charger 401 can be connected to either or both RCU power battery pack 402 or RTR power battery pack 12.

RCU 300 electronics have been previously described and consist of: RCU battery pack 12; control/audio transmitter 40; A/V receiver pack 38; Video monitor 33; RCU speaker 58; RCU A/V receiver antenna 45 and A/V receiver pack 38 to receive A/V signals RS from the RTR; and RCU transmit antennae, block 403, to transmit control and audio signals TS. Antennae within block 403 consist of RCU base load antenna 53 (see FIG. 12) to transmit control signals to the RTR clamshell base and an optional RTC audio transmit antenna 44 (see FIG. 12) to transmit audio to the tail boom pod for two-way communications with the RTR.

RTR electronics have been previously described and consist of electronics both in the tail boom pod and in the clamshell sections.

A RTR battery pack power 12 is enclosed within the base clamshell sections and provides power to all electronics in the clamshell sections and transfers power to the tail boom via slip ring bearings 21 as previously described.

The tail boom section has two receive antennae 404 (not separately shown) to receive control signals TS. Receive antennae 404 consist of boom control receiver antenna 51 (FIG. 10) to receive control signals for tail boom motor control and the optional camera gimble and also optional payload receiver antennae 32a to receive payload activation signals (see FIG. 10). Tail boom receiver pack 52 feeds control signals to boom motor control servo and optional camera gimble 29 to provide control to camera 27. Tail boom A/V transmitter 28 transmits video signals from camera 27 and audio signals from optional microphone 30. A/V signals are sent to RCU 300 via A/V transmit antenna 32.

Clamshell sections receive command signals TS through base load antenna 15 (see FIG. 7) from the RCU for RTR steering and tail boom movement control. Multi-channel receiver 11 sends control information to motor controllers and servo block 405, which contains the aforementioned motor controllers 10 and cam lock servo 13. Each motor controller 10 then separately controls the three aforementioned drive motors and the servo controls the movement of the cam lock mechanism, as depicted all within block 406.

Figure 14A:
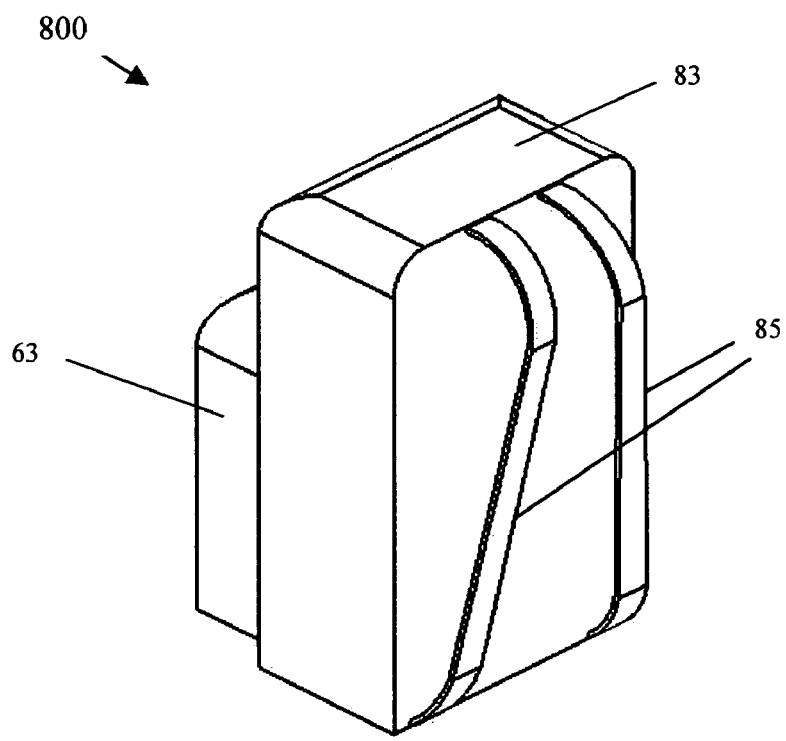
FIG. 14A is a rear perspective view of a backpack carrying package, the preferred packaging embodiment of the present invention.
Figure 14B:
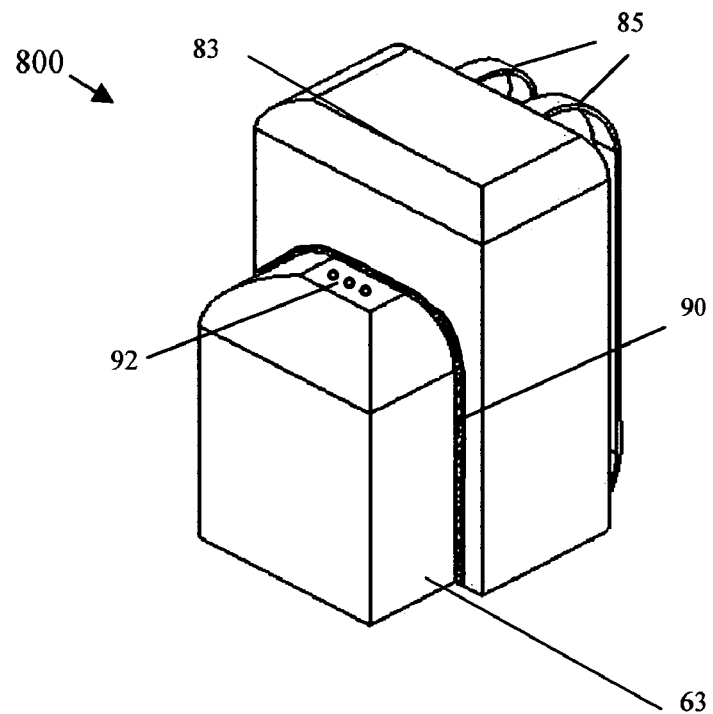
FIG. 14B is a front perspective view of a backpack carrying package, the preferred packaging embodiment of the present invention.

FIGS. 14A, 14B illustrate backpack carrying package 800 which consists of two individual backpacks held together with a zipper. FIG. 14A is a rear perspective view of backpack carrying package 800, the preferred packaging embodiment of the present invention. Control backpack 63 houses the remote control unit while RTR backpack carrier 83 houses the RTR itself. Control backpack antennae holes 92 (FIG. 14B) permit deployment of control unit antennae when the control unit is in active use. RTR backpack shoulder straps 85 allow one individual to carry both units.

FIG. 14B is a front perspective view of backpack carrying package 800. Control backpack 63 attaches to RTR backpack carrier 83 via a zipper 90 such that both backpacks can easily be detached from one another.

Figure 15:
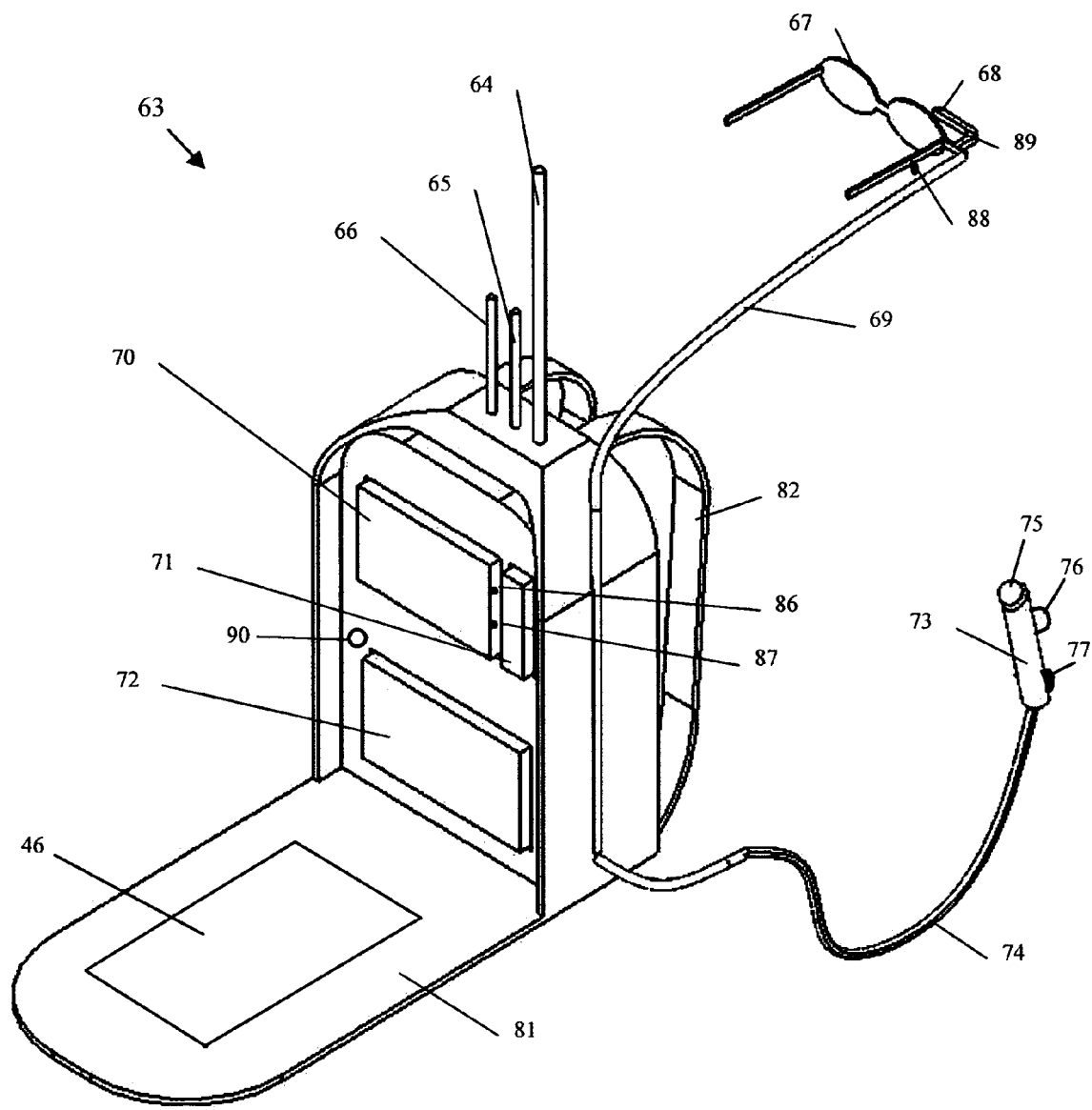
FIG. 15 is a front perspective view of the RCU backpack in an unattached and open state.

FIG. 15 is a front perspective view of remote control unit (RCU) backpack 63 in an unattached and open state. That is, control backpack is shown in a standalone state, unattached to RTR backpack carrier 83 (not shown) and opened up to show its internal contents with control backpack cover 81 unzipped. Although the electronics are identical in function to the aforementioned RCU 300 case packaging, individual components are located for the ergonomic usage by the person carrying RCU backpack 63. Otherwise, all function is identical. RCU backpack flap 81 has an instructional placard 46 mounted inside and contains all of the RCU electronics. RCU shoulder straps 82 allow for individual carrying when not attached to RTR backpack carrier 83 (not shown). Control transmitter 70 is shown along with battery status indicator 86 and remote control pack power activation switch 87. A/V receiver pack 71 and battery 72 are packaged for easy access along with battery charger input terminal 90, which allows remote battery charging capabilities of internal battery packs. Hand controller 73 is connected to the RCU via hand controller electrical cord 74 and contains RTR directional/speed joy stick 75. Hand controller 73 also contains clamshell lock switch 77 to place the clamshells in either locked position or in rolling mode. Boom assist mode (or extreme terrain) activation switch 76 is set in one position to set the boom in climbing assist mode and in another position to allow the boom to be independently controlled by boom control stick switch 80 (see FIG. 16). A 10% or more total forward wheel driving torque is applied when boom assist mode activation switch 76 is set to climbing assist mode. Clamshell lock 77 switch must be set in a 'locked' position in order for boom assist mode activation switch 76 to be set in climbing assist mode (which moves the tail boom into a downward direction to assist the RTR in stair-climbing). Monitor display 68 (referred to by industry as a "heads up" display), remote speaker 88, and microphone 89 are attached to glasses 67 and electrically attached to the RCU via electrical cord 69. In this manner the user can easily see the RTR camera feedback via monitor display 68, can use audio via microphone 89, and also hear what is transmitted from the RTR via remote speaker 88, all while the RTR control person is in a mobile state. There is also an internal area (not shown) reserved for payload activation switching. Any additional sensor information received would be visually displayed on monitor display 68 as overlay information over the visual signal. The RCU is non-tethered with respect to the RTR and controls the RTR via command signal transmission. At the top of RCU backpack 63 are located three antennae; RCU audio transmitter antenna 66 for audio communications to the RTR tail boom pod; RCU A/V receiver antenna 65 to receive A/V signals from the RTR pod; and RCU base load antenna 66 to transmit control signals to the RTR clamshell base. A camera gimble control (not shown) would be added to allow remote camera control.

Figure 16:
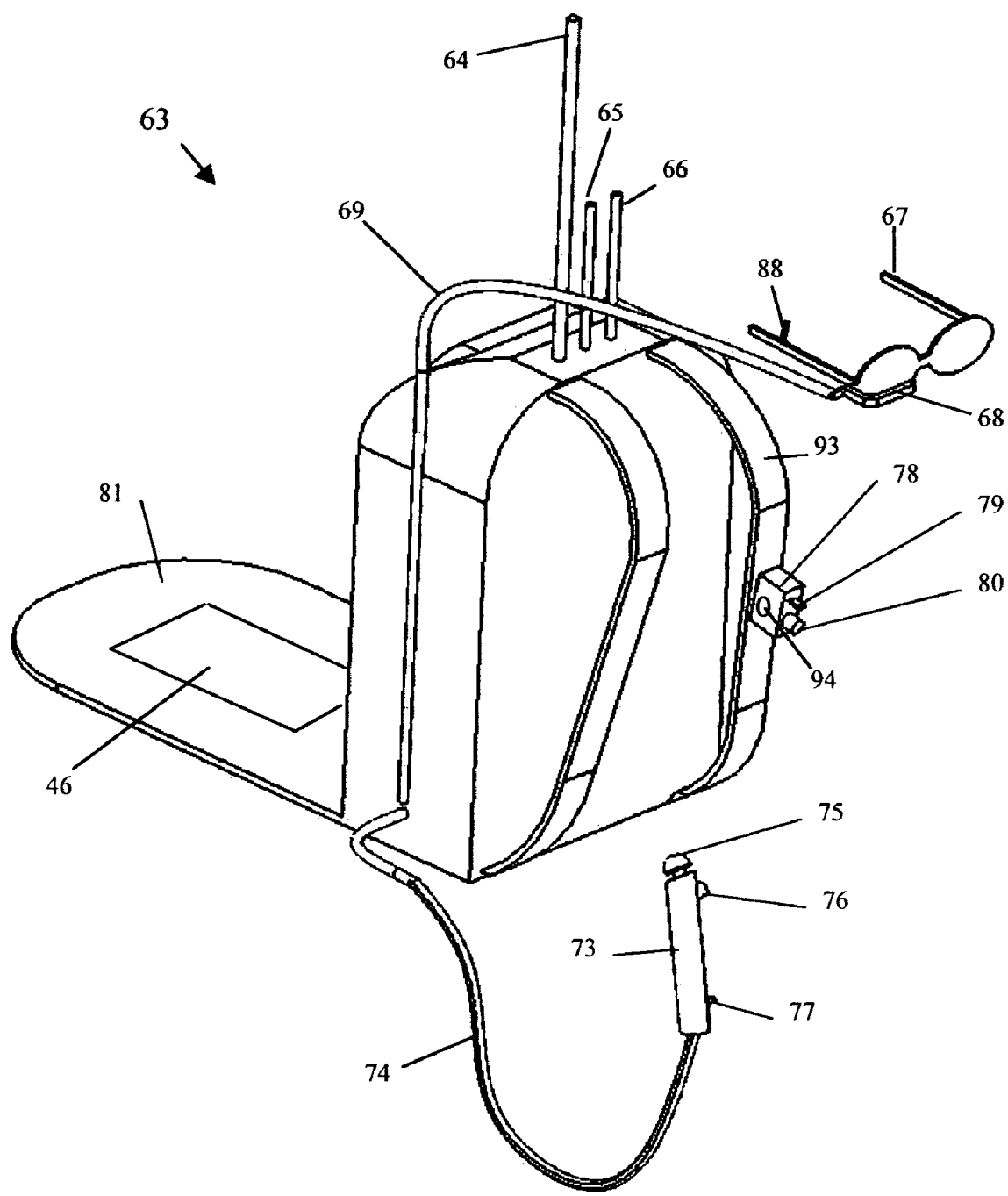
FIG. 16 is a rear perspective view of the RCU backpack in an unattached and open state.
Figure 17:
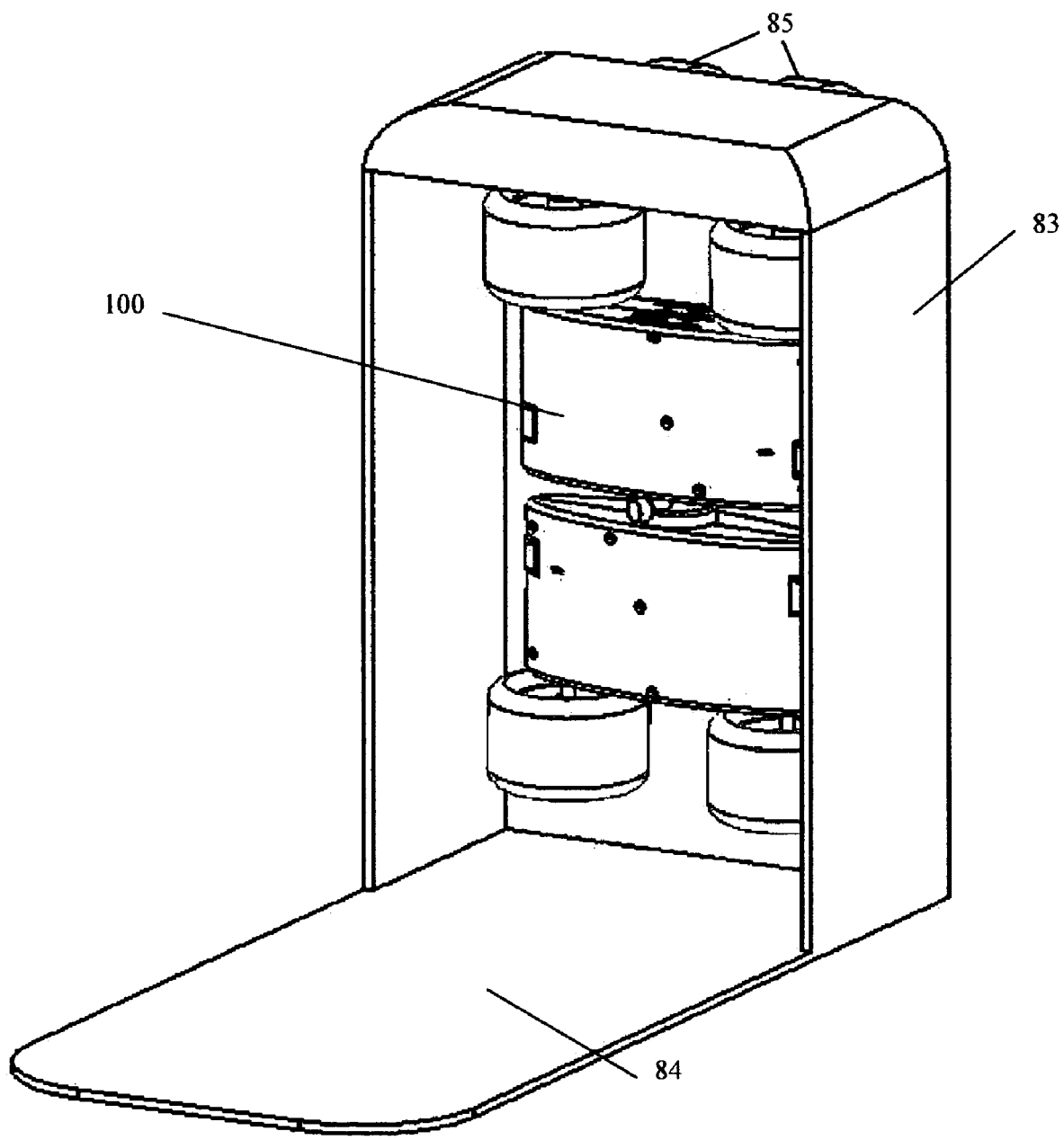
FIG. 17 is a front perspective view of the RTR backpack carrier.

FIG. 16 is a rear perspective view of RCU backpack 63 in an unattached and open state. FIG. 16 shows power/boom control box 78, which is electrically connected to the RCU via electrical wire 93. Power/boom control box 78 contains both a remote RTR power switch 79 (for remote power activation of the RTR) and also contains boom control 80 for incrementally moving the tail boom. Remote speaker 88 and microphone 89 are attached to glasses 67 and electrically attached to the RCU via electrical cord 69.

With RCU backpack flap 81 zippered up, and RCU either attached to RTR backpack 83 or directly strapped to a user, the RCU is easily transported from one location to another. The RCU thus allows personnel to directly control RTR 100 from a remote location and also to continuously be in a mobile state while controlling RTR 100 allowing RTR 100 to act as a reconnaissance vehicle in reconnoitering an area of concern. The RTR reconnaissance would constantly include its ability of climbing stairways, traversing over rugged terrain, transmitting visual feedback, two-way communicating, carrying payloads, sensors, etc.

FIG. 7 is a front perspective view of RTR backpack carrier 83 in an opened position with RTR backpack carrier front flap 84 in a down position and with RTR 100 packed internally for ease of transport.

Figure 18:
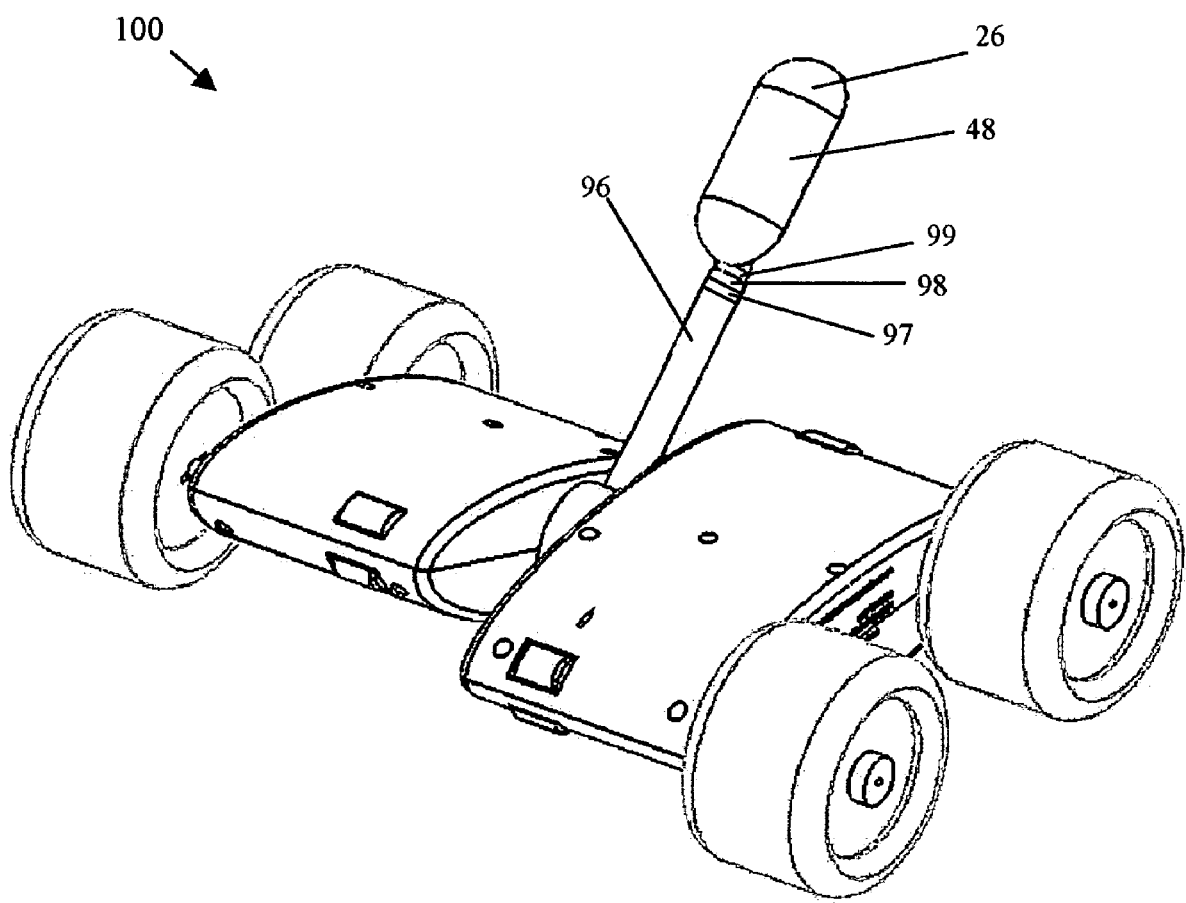
FIG. 18 is a front perspective drawing of the RTR with a telescopic tail boom in a collapsed position, an alternate embodiment of the present invention.
Figure 19A:
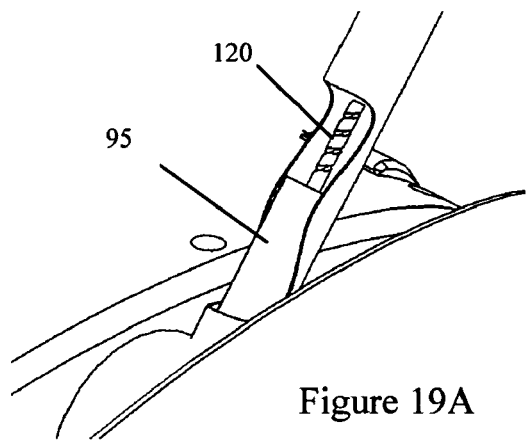
FIG. 19a is a cut out sectional blow-up view of the worm gear and worm gear servomotor of section-A of FIG. 19.

FIG. 18 is a front perspective drawing of RTR 100 with a telescopic tail boom in a collapsed position, an alternate embodiment of the present invention. Telescopic tail boom consists of base boom section 96, intermediate boom sections 97, 98 and top section 99. A servomotor (see FIG. 19), which is located under base boom section 96, will extend or collapse all sections via a worm drive (see FIG. 19, 19*a*). Tail boom movement is controlled via remote control. With a telescopic tail, the tail boom can be extended, or collapsed, depending on conditions related to the visual field or tail boom assist requirements.

Figure 19:
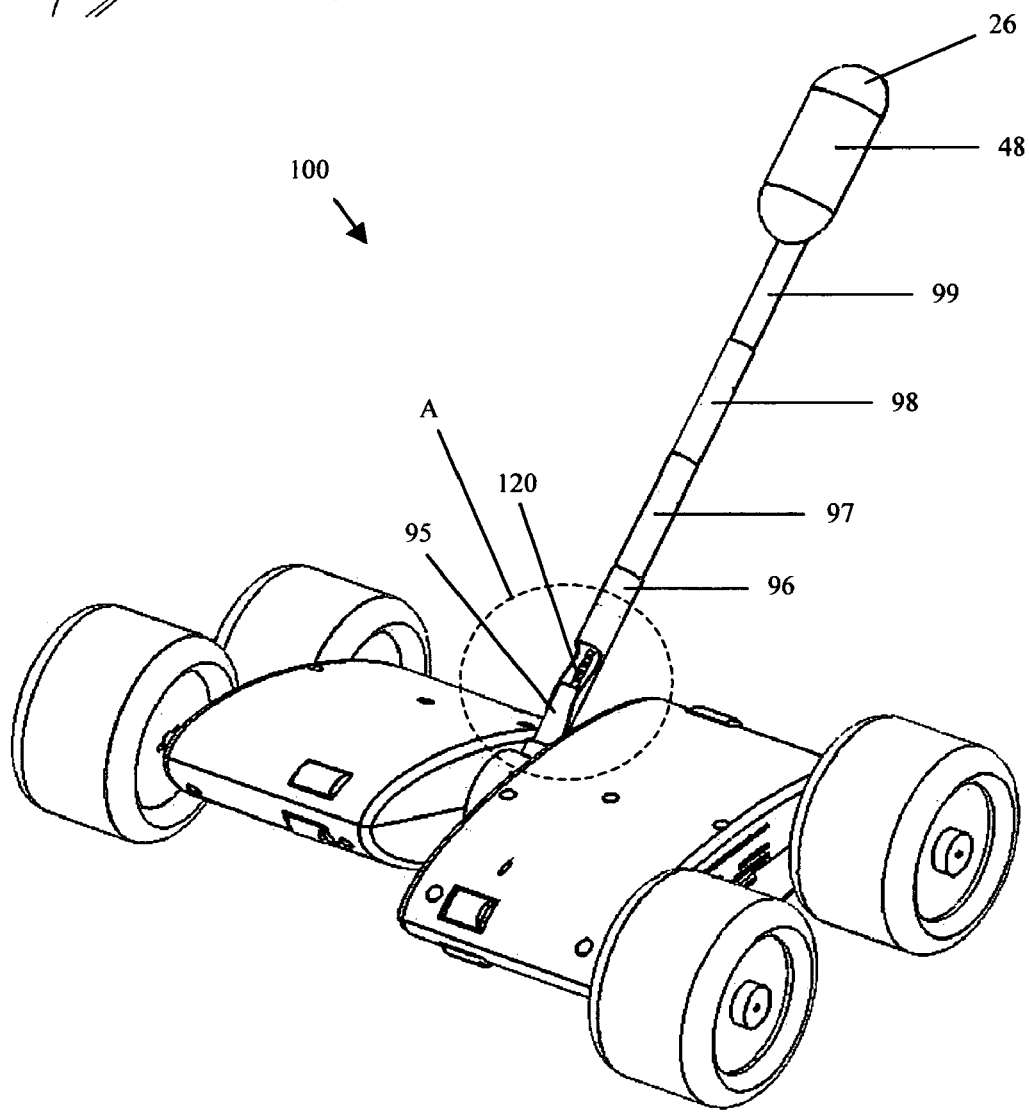
FIG. 19 is a front perspective drawing of the RTR with a telescopic tail boom in an extended position, an alternate embodiment of the present invention.

FIG. 19 is a front perspective drawing of RTR 100 with the telescopic tail boom in an extended position, an alternate embodiment of the present invention. In this extended position, telescopic worm gear servomotor 95 will control worm drive 120 to extend intermediate sections, 97 and 98 and top section 99 to either a full extension or partial extensions as required. Telescopic worm gear servomotor 95 and worm drive 120 is shown in cross sectional view (cut out section-A) and again in blow-up illustration in FIG. 19*a*.

Figure 20:
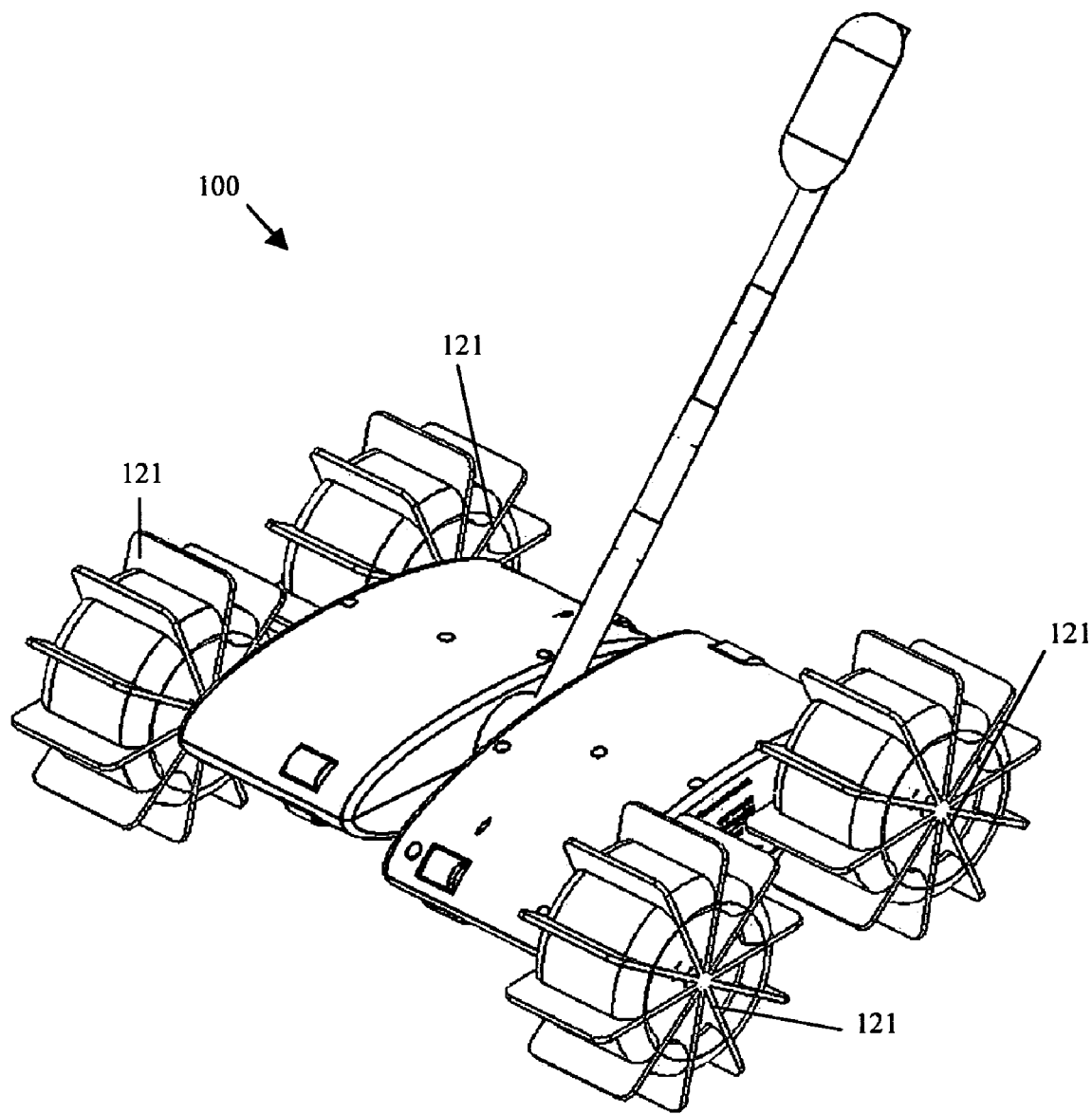
FIG. 20 is a front perspective drawing of the RTR with an alternate paddle wheel configuration, an alternate embodiment of the present invention.

FIG. 20 is a front perspective drawing of RTR 100 with a 'paddle wheel' configuration, an alternate embodiment of the present invention. In this configuration wheels are driven as previously described but each wheel has paddle-like extensions 121. This alternate wheel configuration would be desirable, for example, when crossing water is a requirement. Each clamshell and the tail boom pod would have watertight gaskets incorporated along with floatation assistance such as internal foam. This alternate embodiment would allow the RTR to travel over ponds, lakes, streams and the like for reconnaissance missions with water travel requirements.

Figure 21:
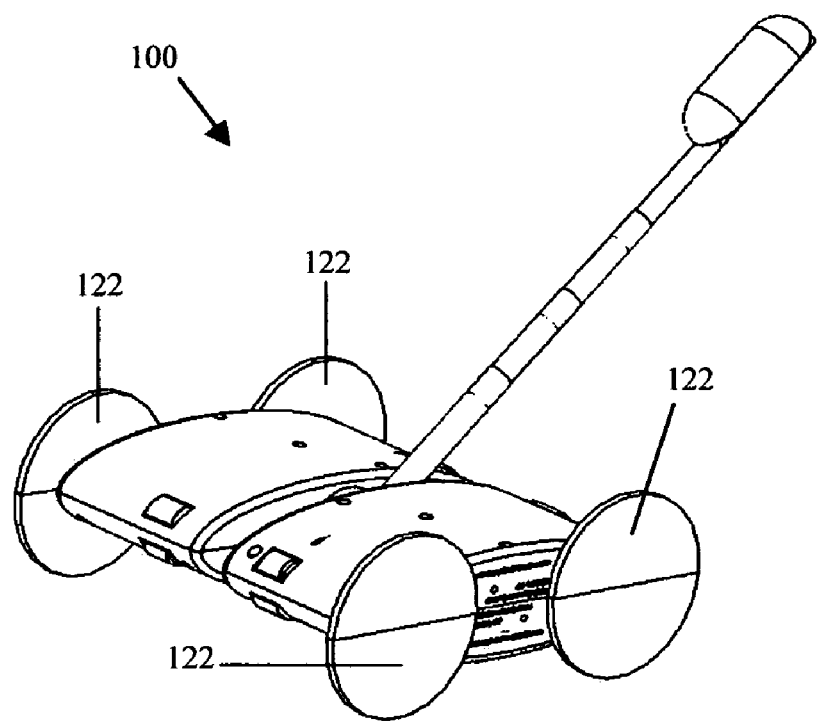
FIG. 21 is a front perspective drawing of the RTR with an alternate non-driven disk wheel configuration, another alternate embodiment of the present invention.

FIG. 21 is a front perspective drawing of RTR 100 with an alternate non-driven 'disk support' configuration, another alternate embodiment of the present invention. In this configuration disk supports 122 would be rigidly attached (non-rotatable) to RTR 100 but not be driven by any motor. In this configuration RTR 100 would be in the aforementioned and described 'stair-climbing' mode. Thus the clamshells would be locked together, the tail boom would be moved down into the rear plane surface, and the RTR would be also rotate or 'pan' when climbing over extreme terrain or stair climbing.

Figure 22A:
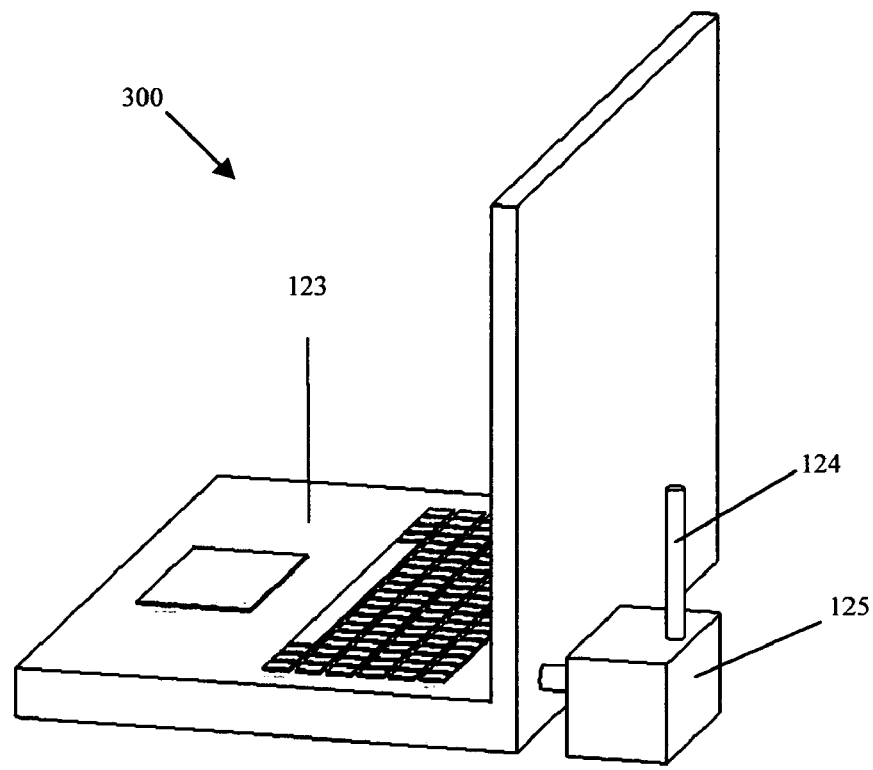
FIG. 22a is a rear perspective drawing of a laptop control unit, an alternate body of the present invention.

FIG. 22*a* is a rear perspective drawing of laptop control unit 300, an alternate body of the present invention. In this configuration a cable attachment (PC-parallel, USB, or other standard PC connection would attach transmitter/receiver 125 with antenna 124 to laptop PC 123.

Figure 22B:
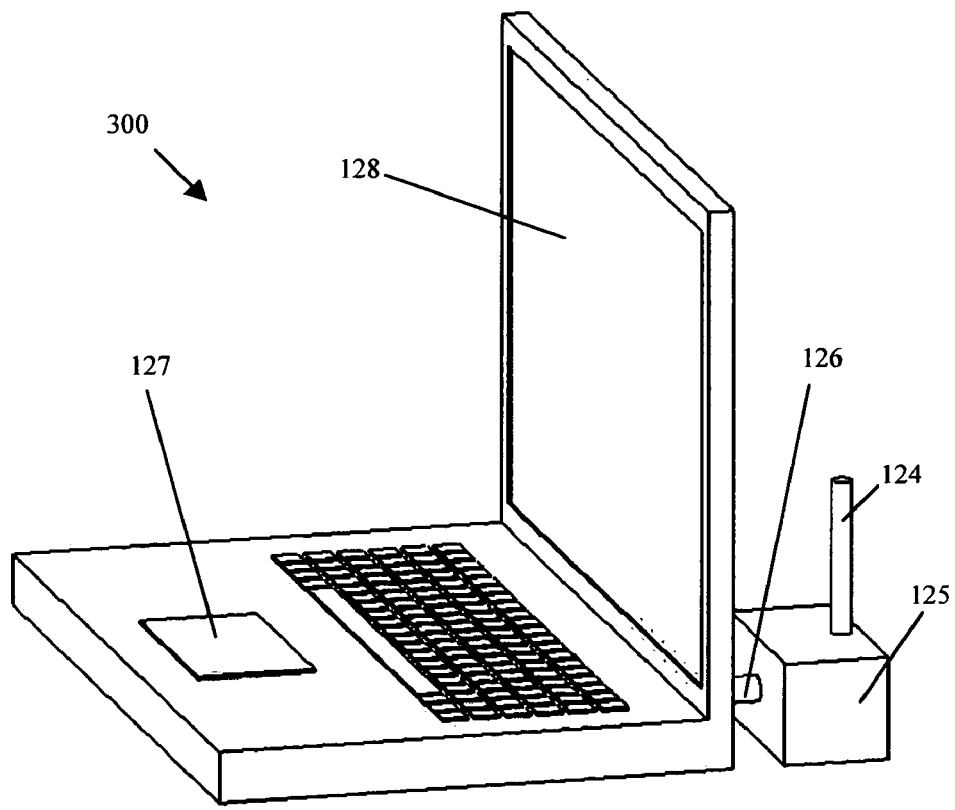
FIG. 22b is a front perspective drawing of a laptop control unit, an alternate embodiment of the present invention.

FIG. 22*b* is a front perspective drawing of a laptop control unit 300, an alternate embodiment of the present invention. In this configuration a cable 126 attaches transmitter/receiver 125 with antenna 124 to laptop PC 123. Monitor 128 would display the aforementioned camera feedback PC 123 would have a standard keyboard, speaker and microphone and utilize mouse pad 127 to control the RTR.

Thus the RCU and RTR are easily portable with the RTR easily unpackaged and set into a reconnaissance mode while under remote control by an individual who is also mobile during the entire reconnaissance operation.

Although the present invention has been described with reference to preferred embodiments, numerous modifications and variations can be made and still the result will come within the scope of the invention. No limitation with intended or should be inferred.

I claim:

1. A robot adapted to claim stairs and obstacles, said robot comprising:
   a left body section;
   a right body section;
   said left and right body sections forming a robot body;
   a pivotable tail boom mounted between the left and the right body section;
   a plurality of support legs affixed to each body section, wherein the robot body is supported above a ground surface;
   a motor housed in the robot body;
   wherein the motor powers the tail boom downward in an obstacle climbing mode against a ground surface, thereby rotating a rear end of the robot body upward and forward to accomplish a flipping/panning of the robot body, thereby effectuating a positioning of a pair of rear support legs up and over a first obstacle; and
   wherein the motor again powers the tail boom downward and repeats the panning of the robot body over a second obstacle.

2. The robot of claim 1, wherein the plurality of support legs further comprise a left forward and rearward set Of wheels and a right forward and rearward set of wheels, all said wheels having a driving source mounted inside the robot body, thereby enabling the robot to travel.

3. The robot of claim 2, wherein the left set of wheels has a motive power source, and the right set of wheels has a motive driving source, thereby enabling a turning of the robot by varying a speed of the left and right set of wheels.

4. The robot of claim 3, wherein the left and the right bodies are each a separate housing interconnected by a central axle, thereby providing an independent movement of each body about the center axle.

5. The robot of claim 4, wherein the motive driving source further comprises a left and a right motor housed in their respective body sections.

6. The robot of claim 4 further comprising a remote signal receiver and a control processor, wherein the remote signal carries control information including speed, direction and a stair climbing mode, wherein the stair climbing mode comprises a locking of the left and the right bodies in a fixed position relative to one another, and the tail boom is lowered downward to pan the robot body while all the wheels are powered forward.

7. The robot of claim 6 further comprising a video camera having a transmitter for its signal.

8. The robot of claim 7, wherein the video camera is mounted on the tail boom.

9. The robot of claim 8 further comprising a microphone and a speaker and an audio transmitter.

10. The robot of claim 7 further comprising a payload area.

11. The robot of claim 8, wherein the tail boom has variable length mode of remote control operation.

12. The robot of claim 11, wherein the variable length mode further comprises a telescoping tail boom having a worm gear drive.

13. The robot of claim 7 further comprising a remote control unit having a user headgear heads up display and a joystick control module.

14. The robot of claim 13, wherein the robot and the remote control unit each have a separate battery power source.

15. The robot of claim 14, wherein the robot further comprises a speaker and a microphone, and the user headgear further comprises a microphone and a speaker sending a voice signal to the robot via the remote control unit.

16. The robot of claim 7 further comprising a remote control unit having a video screen and a control panel to control the robot.

17. The robot of claim 2 further comprising an environmental sensor and a transmitter for sending the environmental sensor signal to a remote receiver.

18. The robot of claim 8, wherein the tail boom has a remote controllable positioning mechanism.

19. The robot of claim 4, wherein the robot has a positive buoyancy in water, and the wheels have a paddle type extension.

20. A robot comprising:
a left clam shell housing means functioning to house a front and a rear wheel and a motor for powering the left wheels, and providing a connection to an interconnect axle;
a right clam shell housing means functioning to house a front and a rear wheel and a motor for powering the right wheels and providing a connection to the interconnect axle, thereby enabling an independent axial motion between the left and the right clam shell housing means when traversing a rough terrain; and
a tail boom means mounted between the left and the right clam shell housing means functioning to controllably push down against a ground surface causing the left and the right clam shell housings to flip/pan, thereby placing the left and the right rear wheels forward and on top of an obstacle, thus defining a stair climbing mode.

21. The robot of claim 20, wherein the stair climbing mode further comprises a locking of the left and the right clam shell housings into a fixed position relative to one another.

22. The robot of claim 21 further comprising an on board video camera with a transmitter.

23. The robot of claim 22 further comprising a remote control station having a receiver for the video camera signal and a control panel to control the robot.

24. The robot of claim 23, wherein the tail boom means further comprises a mount for housing the video camera.

25. The robot of claim 24, wherein the tail boom has an independent position controller controlled by the remote control station.

26. The robot of claim 25, wherein the remote control station further comprises a user headgear mounted heads up display.

27. The robot of claim 26, wherein each of the robot and the remote control station has a battery pack.

28. The robot of claim 21 further comprising a payload area.

29. The robot of claim 20, wherein the tail boom means further comprises a motor mounted either in the right or the left clamshell housing means.

* * * * *